(12) United States Patent
Ogawa et al.

(10) Patent No.: US 7,149,930 B2
(45) Date of Patent: Dec. 12, 2006

(54) RECORDING/REPRODUCING APPARATUS

(75) Inventors: Hitoshi Ogawa, Yokohama (JP); Seiichi Domyo, Sagamihara (JP); Yukie Hiratsuka, Kawasaki (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 639 days.

(21) Appl. No.: 10/284,238

(22) Filed: Oct. 31, 2002

(65) Prior Publication Data

US 2003/0237024 A1     Dec. 25, 2003

(30) Foreign Application Priority Data

Jun. 25, 2002   (JP) .............................. 2002-184836

(51) Int. Cl.
    *G06F 11/00*    (2006.01)
(52) U.S. Cl. ............................................. 714/42; 714/8
(58) Field of Classification Search .................. 714/42, 714/8; 369/47.1
    See application file for complete search history.

(56) References Cited

U.S. PATENT DOCUMENTS

| | | | |
|---|---|---|---|
| 5,764,881 A | | 6/1998 | Yoshida |
| 6,282,365 B1 | | 8/2001 | Gotoh et al. |
| 6,574,420 B1 | * | 6/2003 | Gotoh et al. .................. 386/95 |
| 6,654,904 B1 | * | 11/2003 | Andoh et al. .................. 714/8 |
| 6,728,899 B1 | * | 4/2004 | Ng et al. ........................ 714/8 |
| 6,754,860 B1 | * | 6/2004 | Kim et al. .................. 714/723 |
| 6,922,802 B1 | * | 7/2005 | Kim et al. .................. 714/723 |
| 6,925,580 B1 | * | 8/2005 | Hoskins ........................ 714/8 |

FOREIGN PATENT DOCUMENTS

| | | |
|---|---|---|
| JP | 04-023120 A | 1/1992 |
| JP | 08-255432 A | 10/1996 |
| JP | 11-086454 | 3/1999 |
| JP | 11-134809 A | 5/1999 |
| KR | 1999-0071862 | 9/1999 |
| WO | WO98/14938 | 4/1998 |

* cited by examiner

*Primary Examiner*—Dieu-Minh Le
(74) *Attorney, Agent, or Firm*—Antonelli, Terry, Stout and Kraus, LLP.

(57) ABSTRACT

The present invention provides a disk unit suitable for recording and reproducing time-series continuous data such as AV data.

When data received as data to be written into recording medium is audio and/or video data, (this data is called AV data hereinafter), address information 403c identifying a beginning sector of the recording medium in which the data has been written is registered in file control information 402. Also, it is determined whether or not the AV data is contiguous with AV data just before written. If it is contiguous, the beginning sector is not registered in control information storage means. Thus continuous data can be handled as one piece of data.

15 Claims, 19 Drawing Sheets

FIG.1A — WHEN READING AV DATA
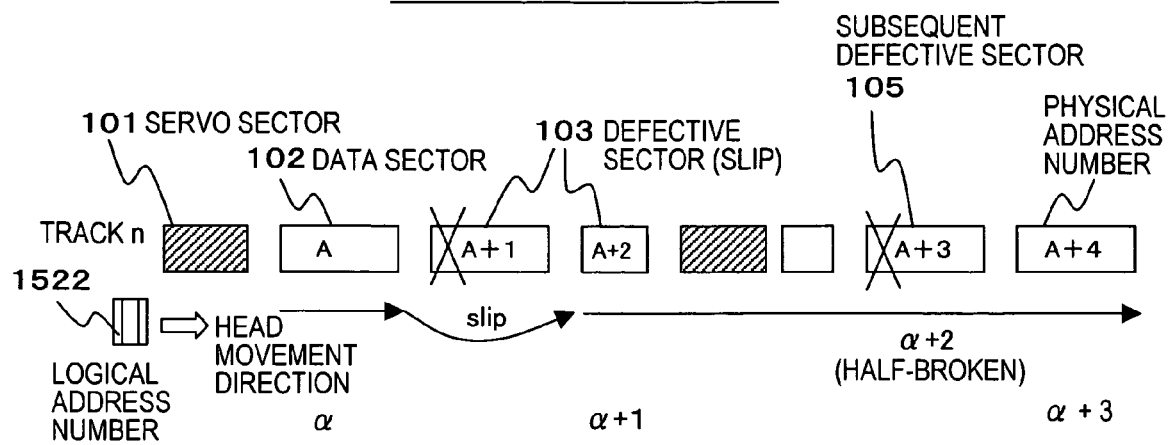
FIG.1B — WHEN WRITING AV DATA
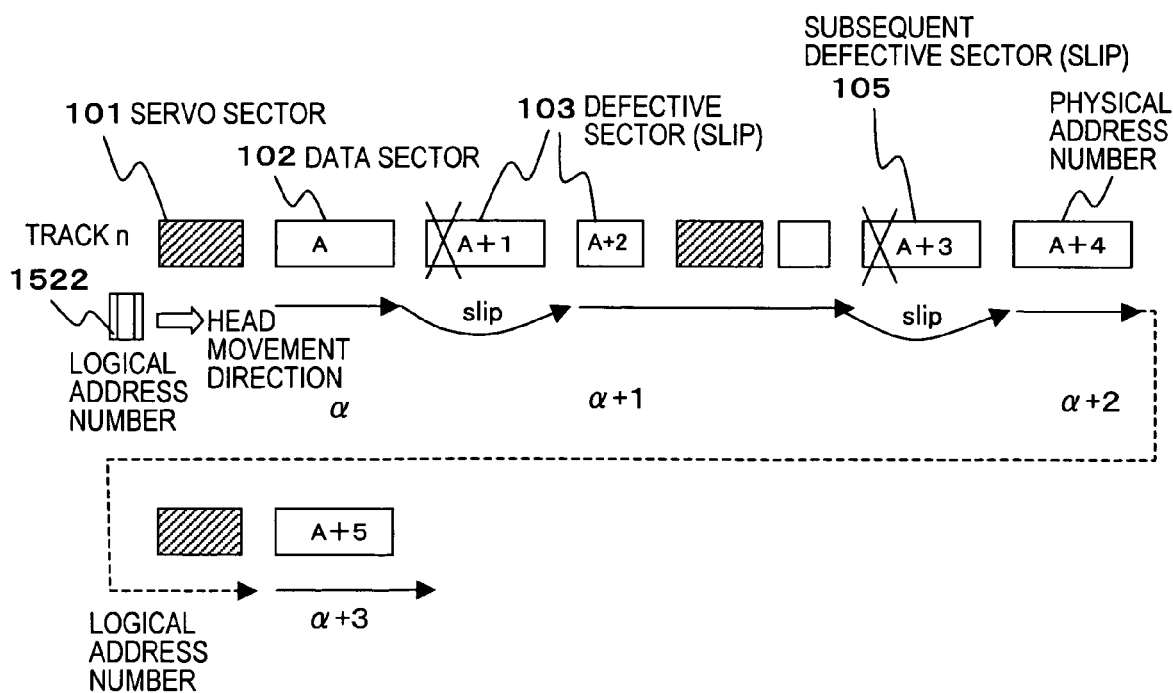

FIG.2A SKIP ACCESS METHOD
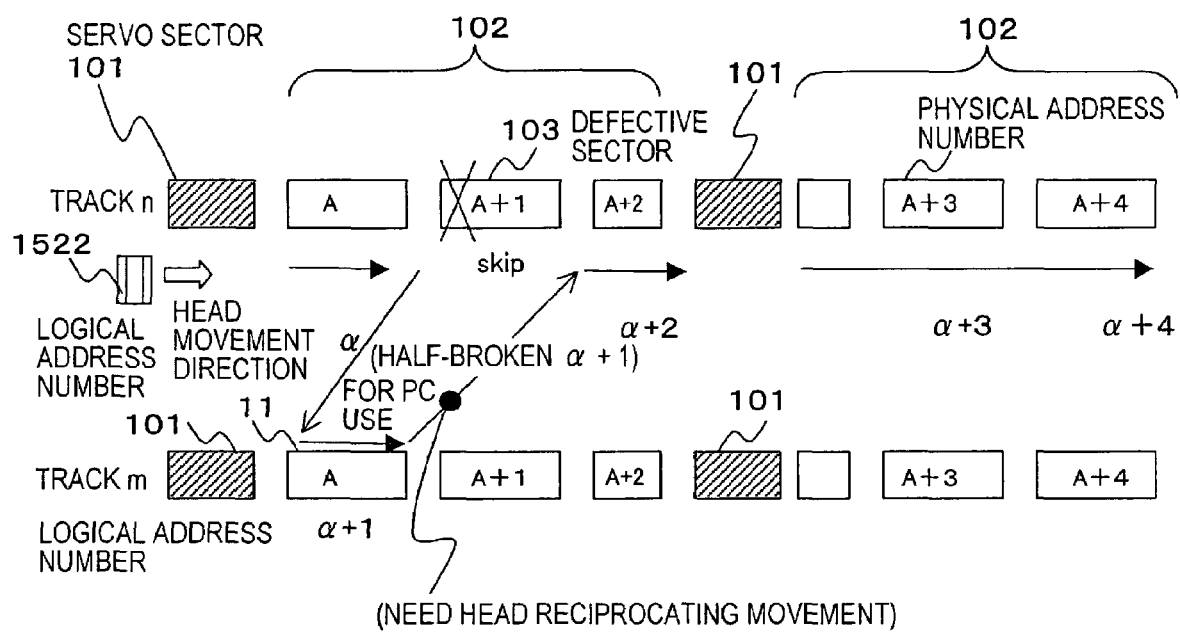
FIG.2B SLIP ACCESS METHOD
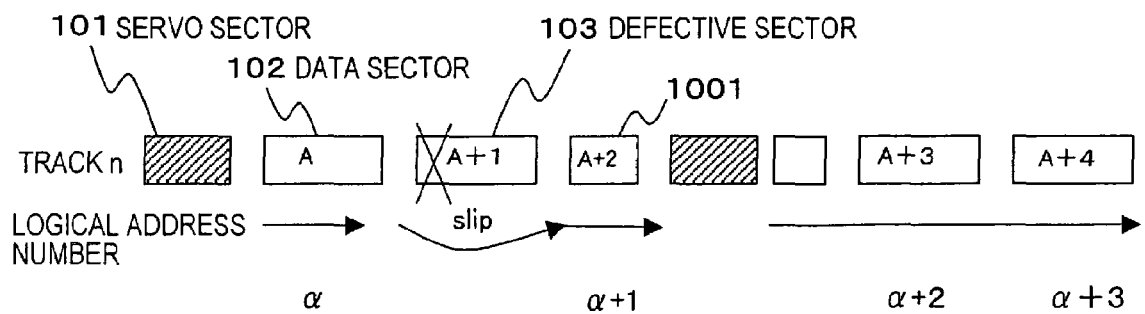

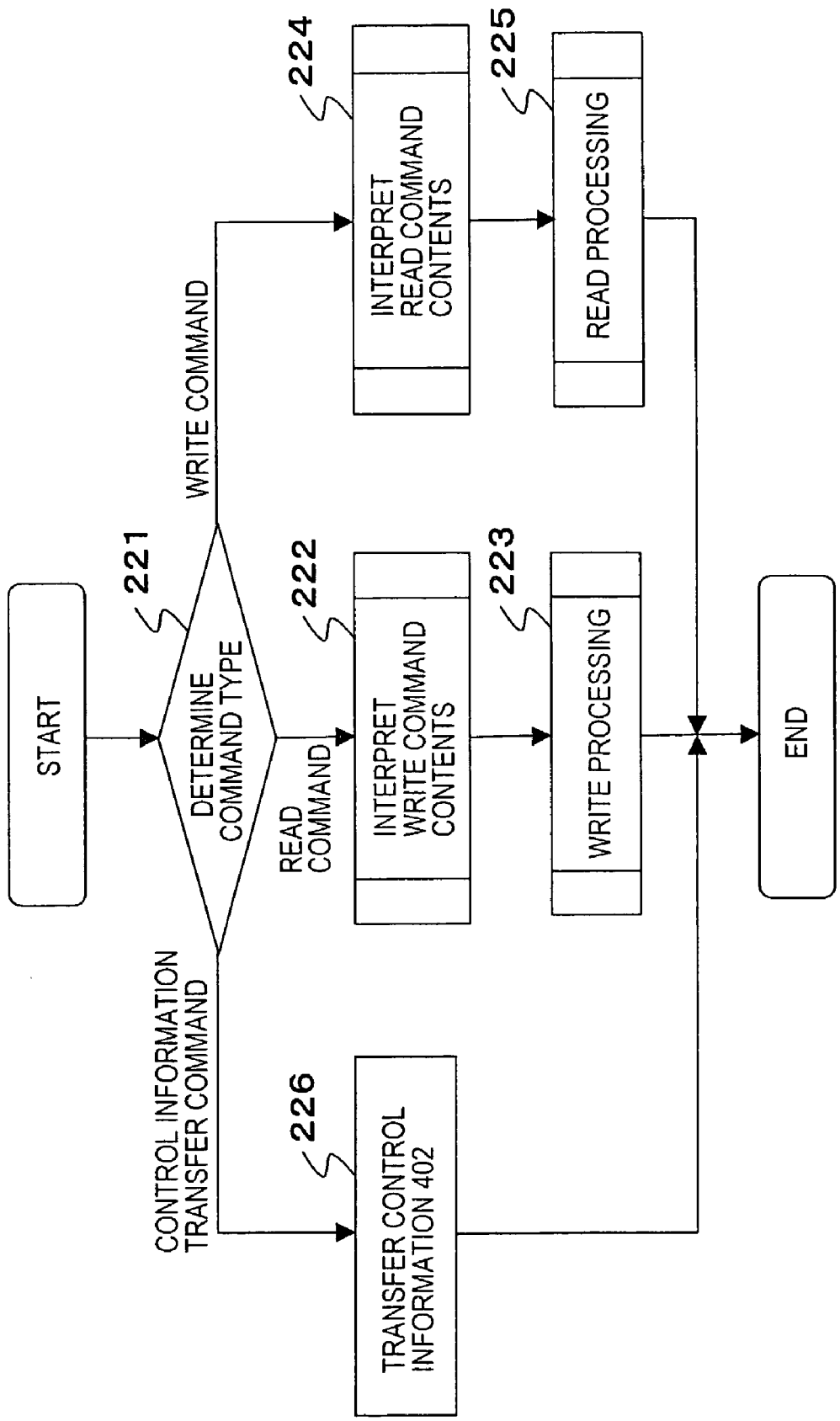

FIG. 6A WRITE COMMAND INTERPRETATION PROCESSING
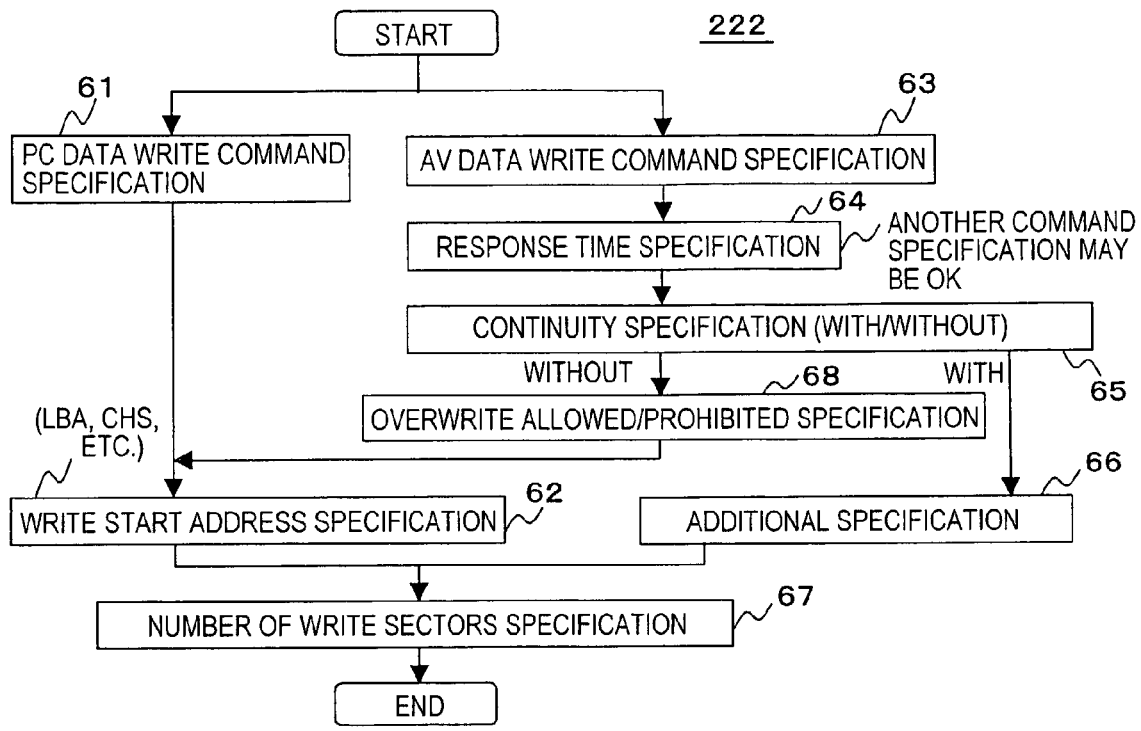
FIG. 6B READ COMMAND INTERPRETATION PROCESSING
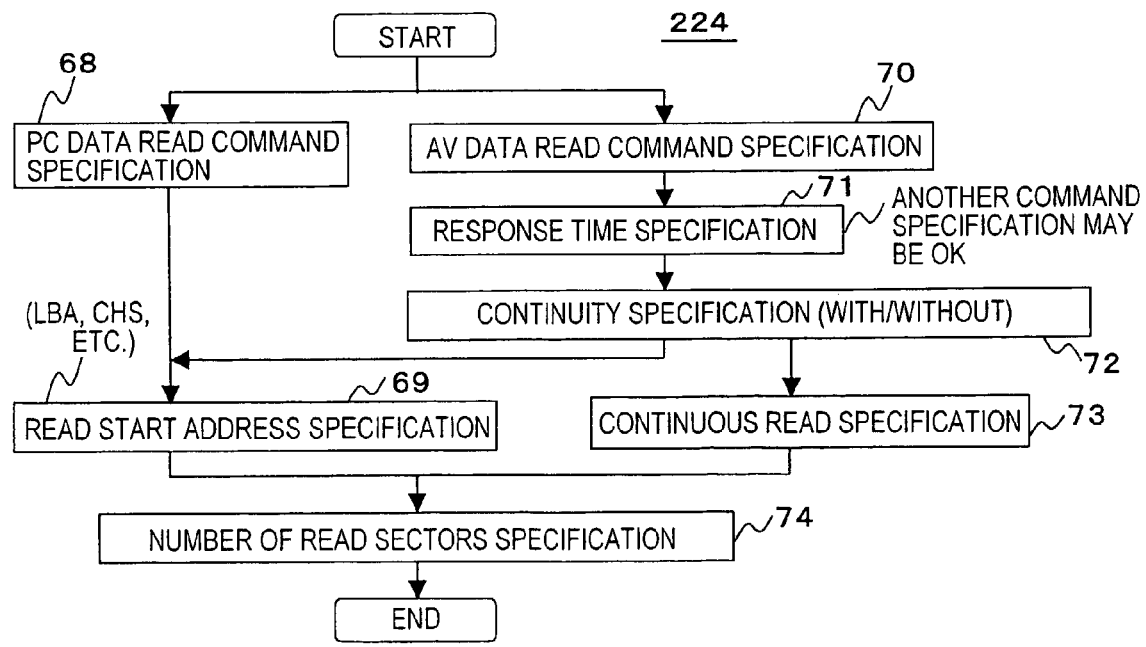

DELETION ALLOWED/PROHIBITED CHANGE COMMAND INTERPRETATION PROCESSING
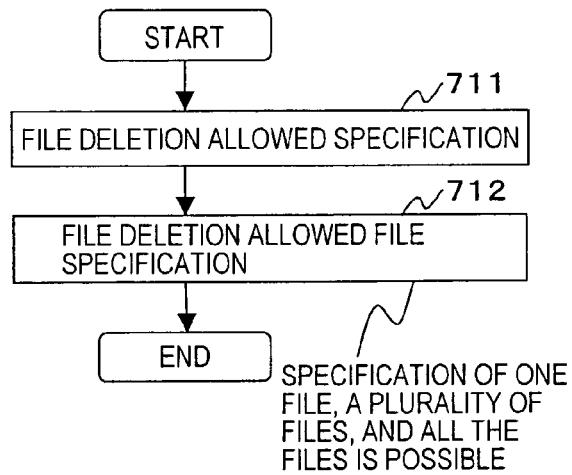
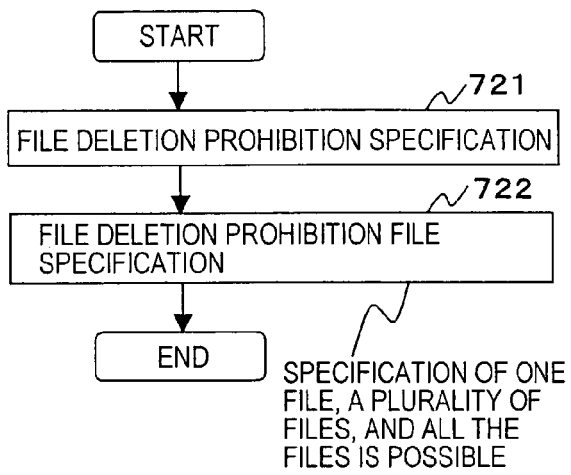
DIVISION/COMBINATION COMMAND INTERPRETATION PROCESSING
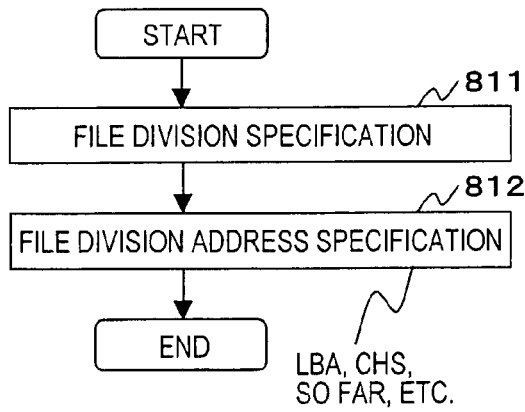
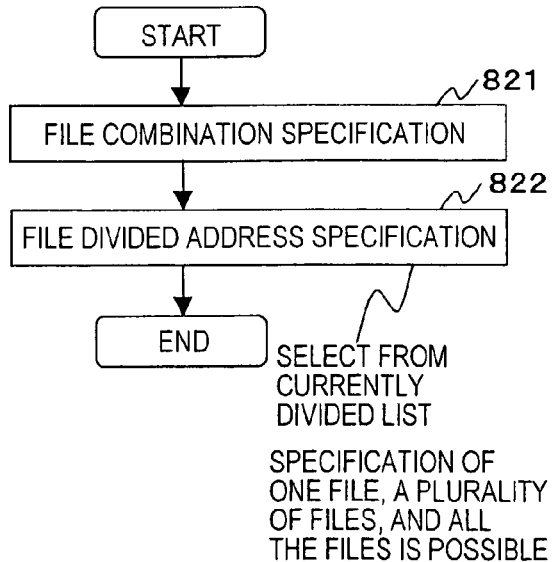

CONCATENATION/CANCEL COMMAND INTERPRETATION PROCESSING
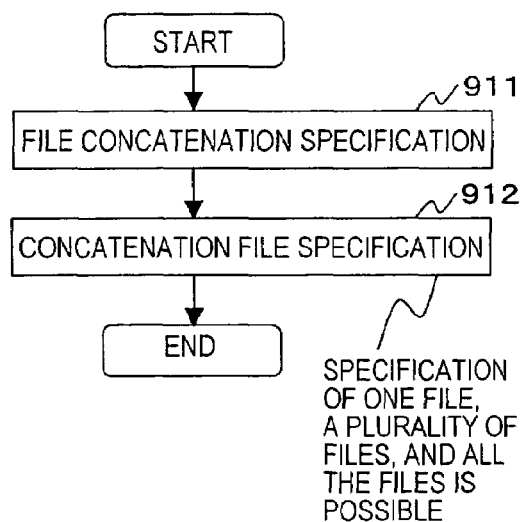
FIG.9A
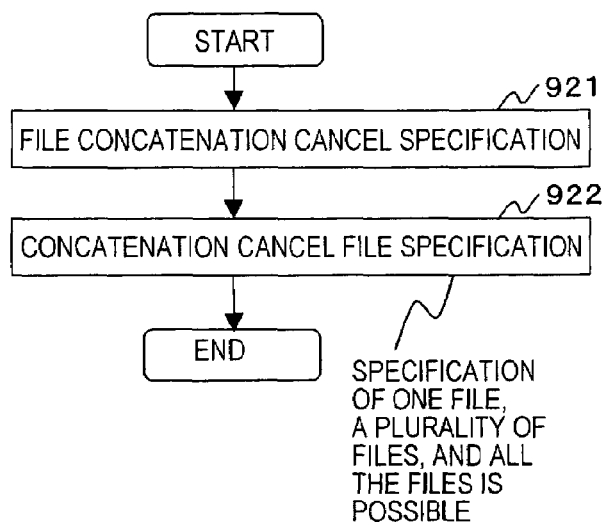
FIG.9B
FIG.10
RESPONSE TIME SPECIFICATION COMMAND INTERPRETATION PROCESSING
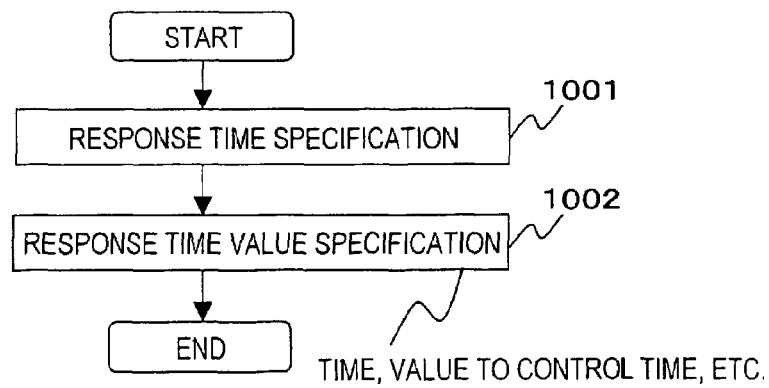

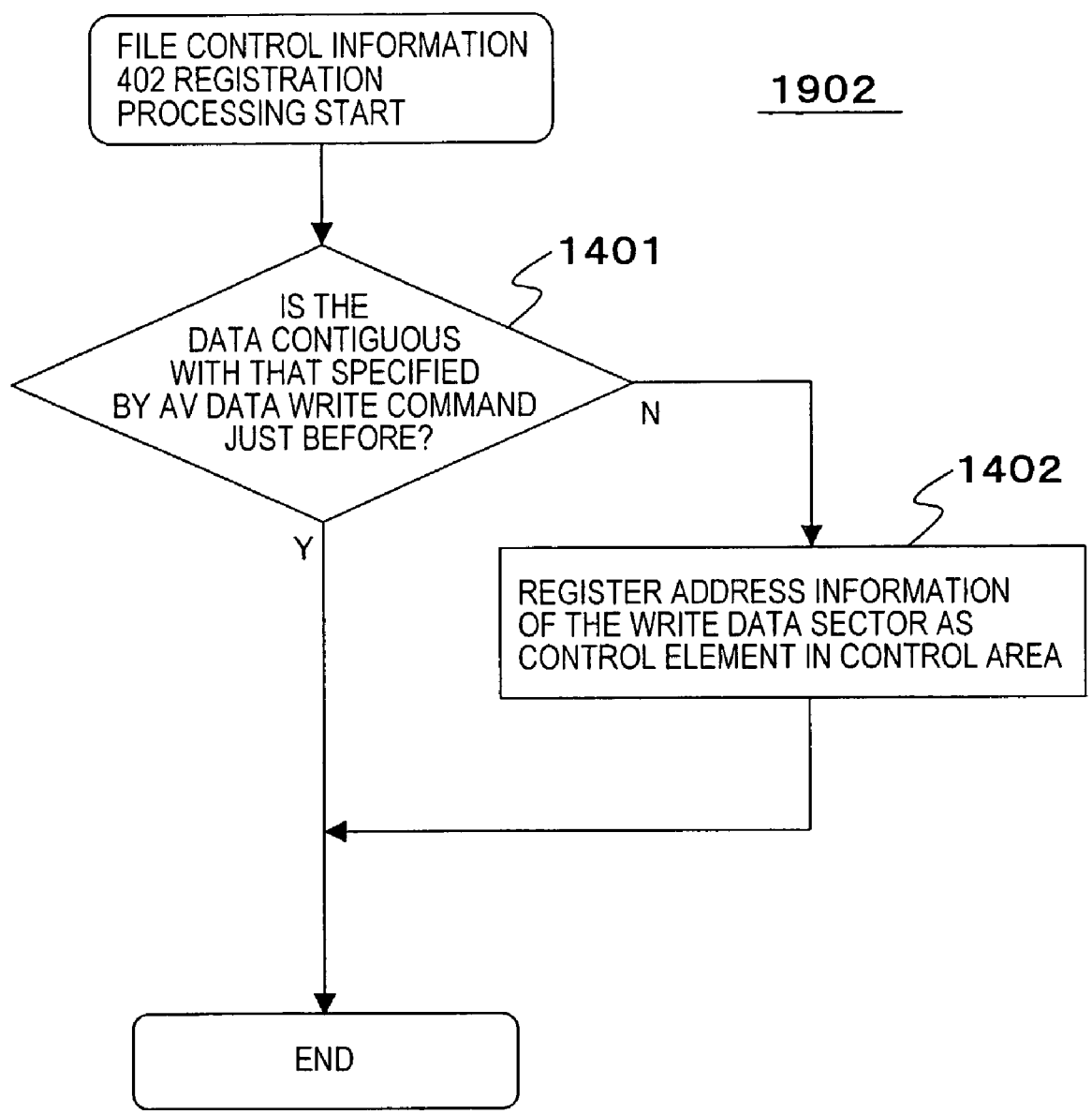

FIG. 16A BEFORE REWRITING (WHEN REWRITE ALLOWED)
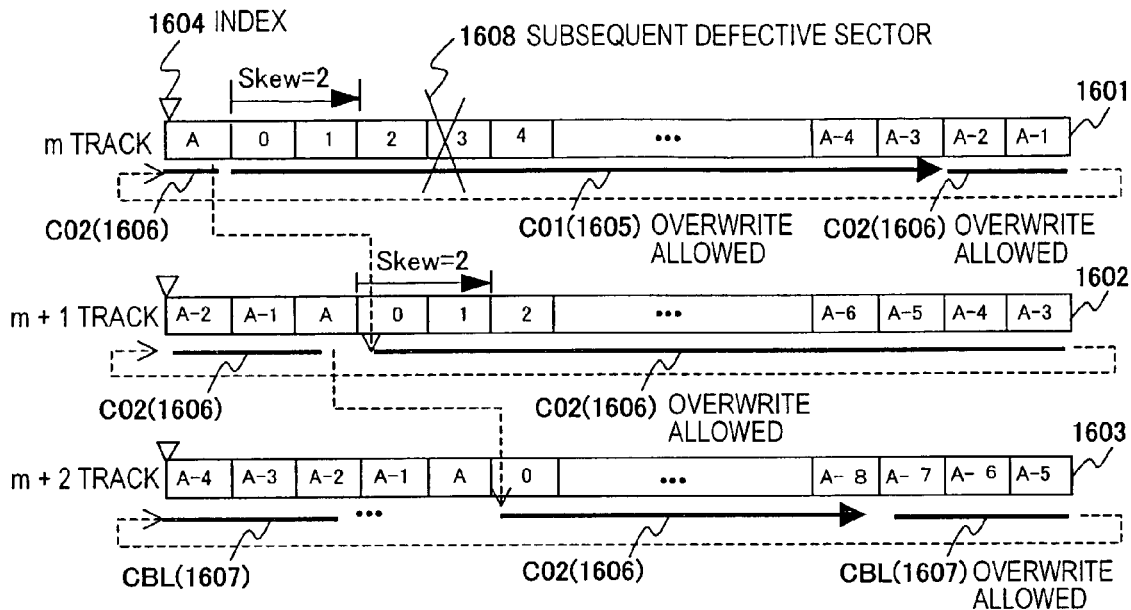
FIG. 16B AFTER REWRITING (WHEN REWRITE ALLOWED)
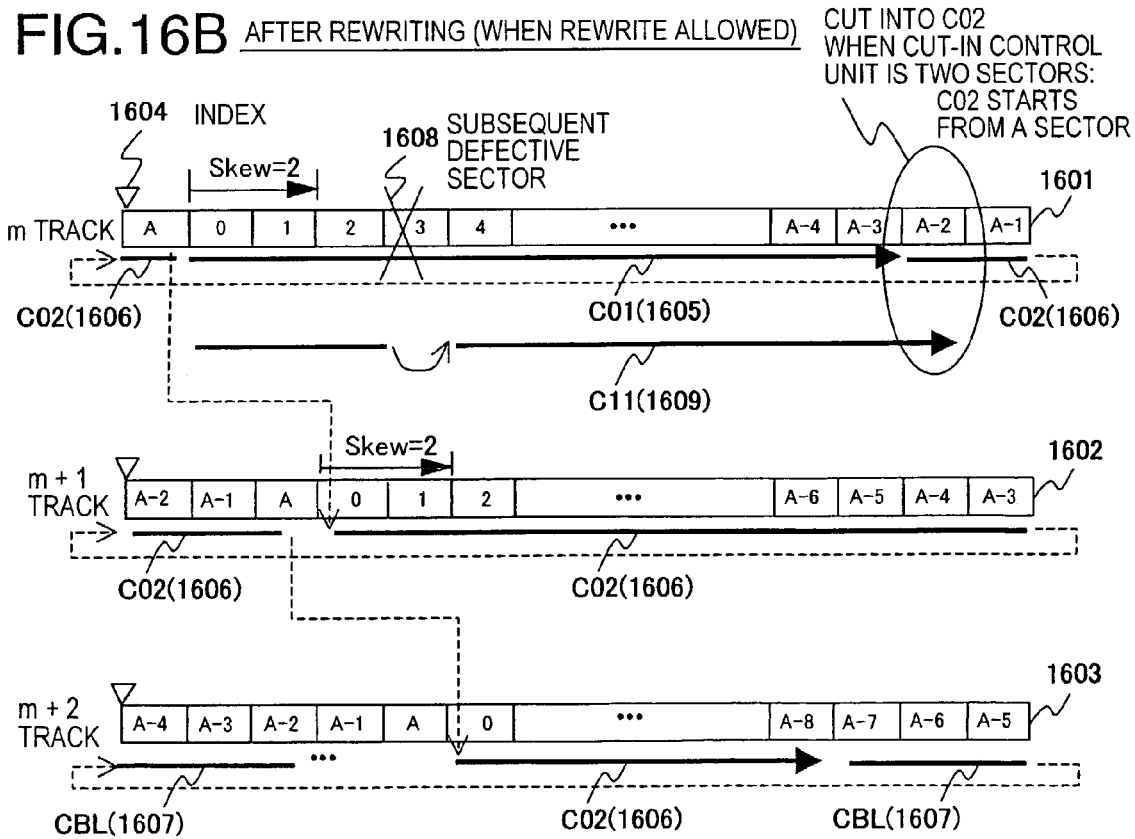

FIG.17A  BEFORE REWRITING (WHEN REWRITE PROHIBITED)
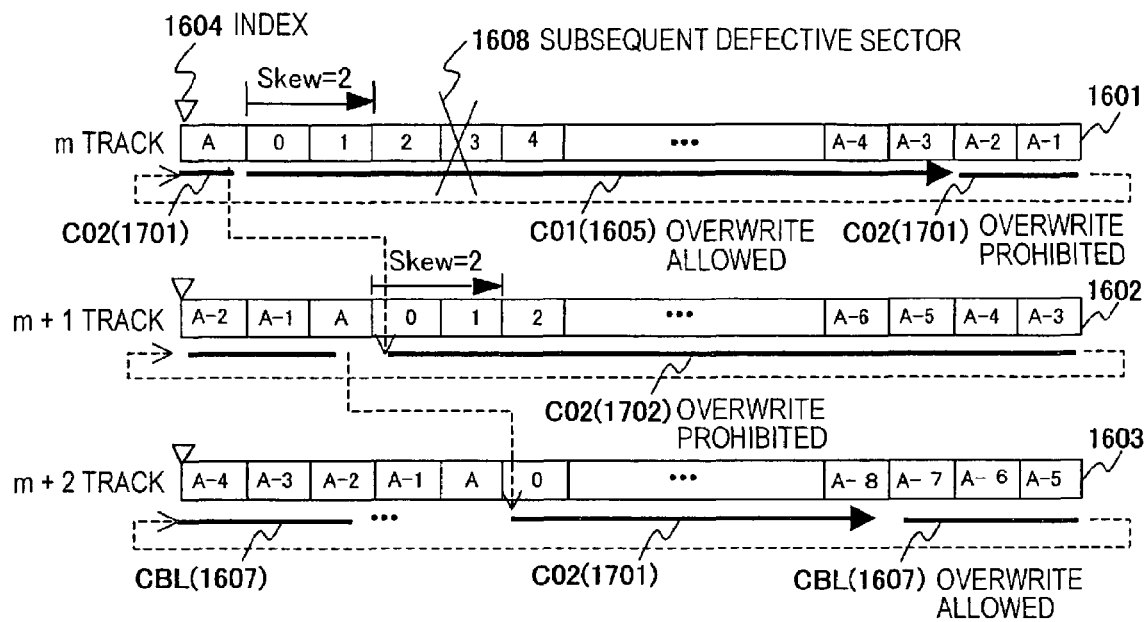
FIG.17B  AFTER REWRITING
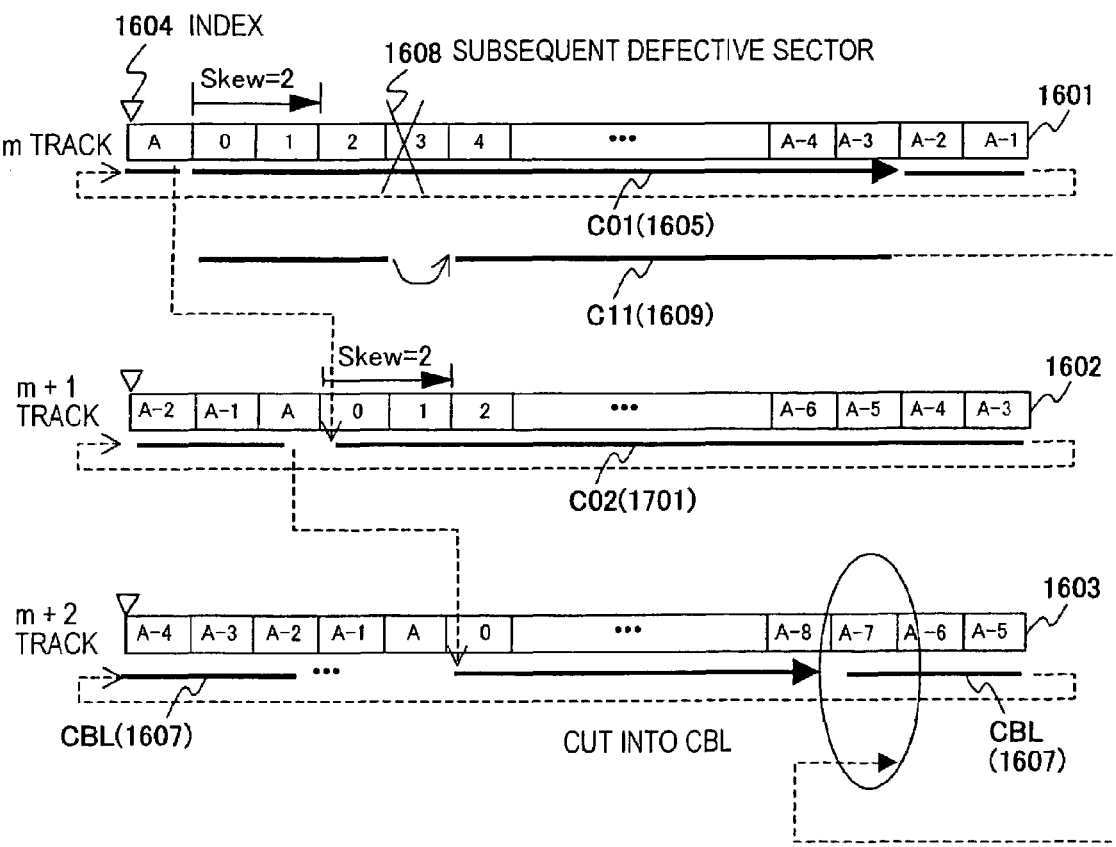

(WHEN HEAD = 0, m TRACK BECOMES CYLINDER NUMBER = m HEAD NUMBER = 0)

FIG.21A  WHEN WRITING PC DATA
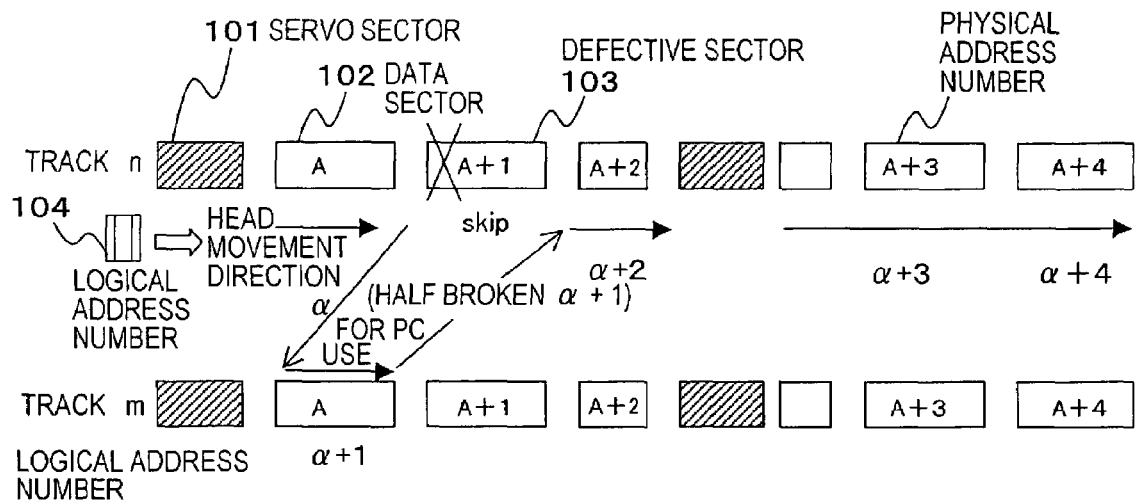
FIG.21B  WHEN WRITING AV DATA
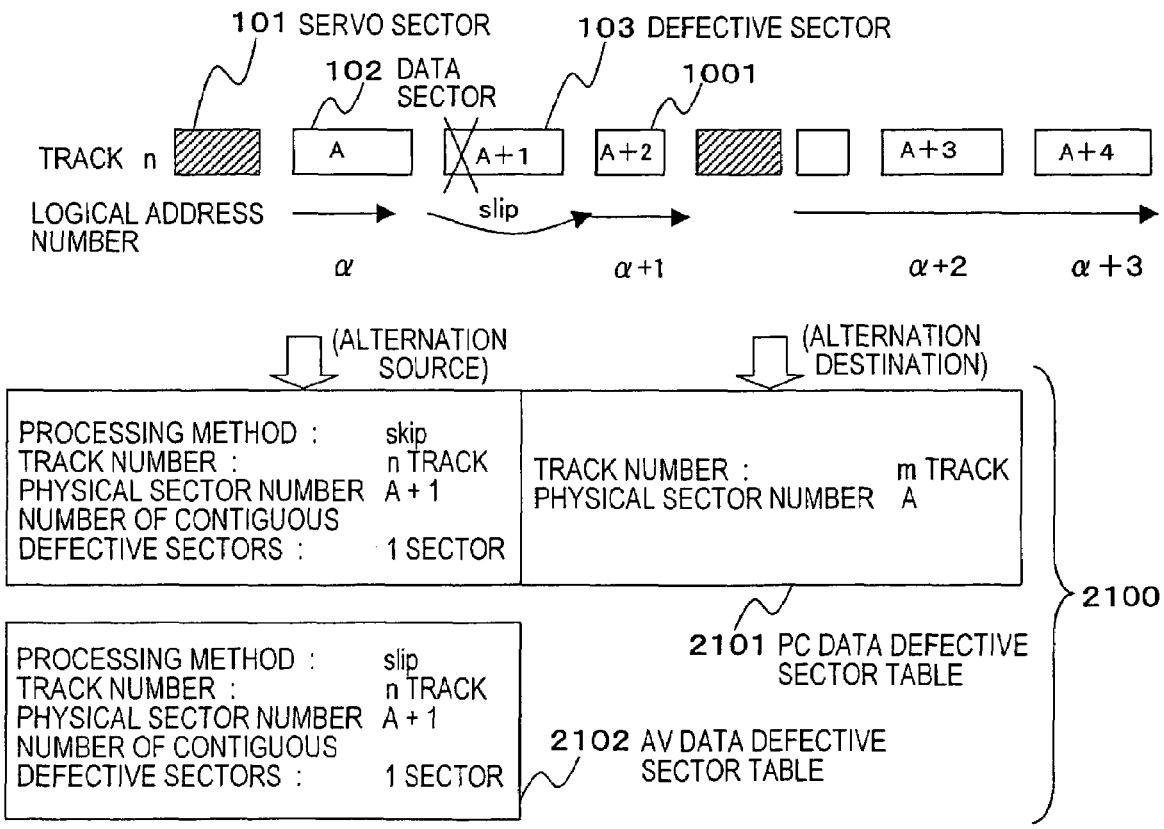

RECORDING/REPRODUCING APPARATUS

BACKGROUND OF THE INVENTION

The present invention relates to a recording/reproducing apparatus, and more particularly to a recording/reproducing apparatus suitable for storing audio and/or video data that is generally accessed sequentially.

In recent years, disk units such as hard disk units, optical disk units, magnetic optical disk units, etc. have been rapidly improved in its miniaturization, processing speed, multi-functional features, and price reduction. Particularly, the recording density per unit area of hard disks has been improved remarkably, and it now exceeded 10 Gbits per one inch square. Also, technical developments are currently under way in order to make it 100 Gbits per one-inch square in a few years. With such increasing recording density, the storage capacity per one disk unit has become a larger volume. Currently, a disk unit of 3.5 type with one-inch thickness with a 166 GB capacity has been achieved, and realization of 1 TB disk unit is no longer a dream in the future. Furthermore, it is considered that even a small disk unit of 1.0 type, for example, can have 100 GB capacity.

In recent years, by utilizing a larger volume of hard disk units, there are cases where audio and video data (AV data), is recorded in hard disks. For example, in the case of high-definition video data, the transfer rate is usually about 23 Mbps. Thus one-hour video data requires approximately the capacity of 23 Mbps×3600 s=10 GB or more. This means that it will become possible to store about 100-hour AV data in 3.5 type hard disk, and 10-hour AV data in 1.0 type hard disk in a few years. Of course, by reducing AV data in accordance with image resolution of the display unit, a recording period time is further increased.

However, the conventional hard disk units developed for recording personal computer data are not necessarily suitable for recording AV data. Thus, for example, in Japanese Patent Application Unexamined Publication No. 2001-118335, a proposal has been made that user' convenience for handling AV data is enhanced by defining areas for recording a piece of time-series continuous data (stream) on the hard disk, and accessing the data using the record area as a unit in consideration of a characteristic of AV data in which data completeness is not required for AV data as compared with computer data, whereas a certain amount of data needs to be handled continuously.

In the conventional hard disk units, when a defective sector occurs, the following skip processing or slip processing has been carried out, as in the past, in order to alternate another sector for the defective sector. By the processing disk units perform reading and writing data from the host while avoiding using the defective sector.

The skip processing is processing for substituting a sector prepared in reserve for a defective sector which has been no longer readable and/writable in the normal manner due to the defect occurred mainly after the factory shipment. For example, as shown in FIG. 2A, a servo sector 101 and a data sector 102 exist on a track n, and that sectors on a track m are kept for reserved sectors for alternation. When a defect occurs in a sector 103 having a physical sector number A+1 (logical sector number α+1), a sector 11 having a physical sector number A on a track m and kept in advance for a reserved sector for alternation is registered as a logical sector number α+1. By this processing, when a head 104 accesses data consecutively from a logical sector number a on the track n the head 104 moves to the track m at the position of the defective sector 103, accesses the alternation sector 11 having the logical sector number α+1, returns to the track n again, and accesses a sector having a logical sector number α+2 (physical sector number A+2).

On the other hand, as shown in FIG. 2B, the slip processing is processing for assigning a normal sector 1001 which is subsequent to the defective sector 103 with respect to physical allocation in place of the defective sector 103 into and from which data is not readable and/or writable in a normal manner due to a defect found at the inspection before the factory shipment. Specifically, when a sector with a physical sector number A+1, which is subsequent to a physical sector number A (logical sector number α), is the defective sector 103, a sector 1001 with a physical sector number A+2 becomes a logical sector number α+1.

Also, in Japanese Patent Application Unexamined Publication No. 04-023120, the following processing is disclosed: in an array disk unit in which a plurality of disks are used in an array, when an error is detected in data reading the data is corrected in real time to be sent to a host while storing the sector address in the disk unit as an error list. After the reading is complete, during the time when there is no command direction from the host, processing for substituting another sector for the defective sectors in the error list is performed.

Further, in Japanese Patent Application Unexamined Publication No. 08-255432, the following processing is disclosed: an address of a defective sector of which an error has been detected in data reading is stored in a storage unit, and alternation processing is performed when writing data into the defective sector by writing the data into a alternation area . By this processing, alternation processing is not carried out until writing is performed into a defective sector. Thus, if reading continues, reading from the original defective sector is repeated. It is described that a possibility of restoration of the data stored in the defective sector can be increased consequently, and thus reliability can be improved.

Furthermore, Japanese Patent Application Unexamined Publication No. 11-134809 discloses registration of addresses of the sectors at which reading errors occurred . Here, the registration of addresses is made by classifying the errors into three levels, depending on the time when the error is detected. The level 0 is an error sector address detected at shipping from factory, the level 1 is an error sector address detected when formatting by the user, and the level 2 is an error sector address detected when recording and reproducing usual user data . Also, in the recording area on the disk a user data area and a spare area (alternation area) are alternately arranged in advance. When writing data into the user area, registered error sectors are bypassed and writing is performed into the spare areas (alternation areas) by the slip processing. In this time, it is ensured that data is written in a predetermined number of sectors with respect to a pair of user data area and spare area.

AV data has a characteristic in which data completeness is not so much required, but the data is a large volume of time-series continuous data when compared to usual data for the personal computers or the like. However, current disk units employ a recording and reproducing method suitable for personal computers, etc. that require data completeness. In Japanese Patent Application Unexamined Publication No. 2001-118335 described above, recording by each piece of continuous data (stream) on the hard disk is disclosed. However, it does not disclose a mechanism of recording information about where each content of AV data is stored in disk unit. Thus the control method of the AV data content is not revealed. Also, in Japanese Patent Application Unexamined Publication No. 2001-118335 described above, it is not assumed that the AV data stream and the usual computer data with a small volume are recorded in a mixed manner.

Further, in accordance with the increase of recording density of disks, the number of sectors increases, thus it is considered that the number of sectors in which a defect occurs at subsequent stage will increase. If the alternation processing of the subsequently-occurred defective sector is performed by the conventional skip processing, the head needs to reciprocate to the reserved sector located at a physically remote position. Thus a possibility will arise that time runs out for the head movement when recording and reproducing time-series continuous AV data in a short response time. Furthermore, in the techniques of Japanese Patent Application Unexamined Publication No. 04-023120 and Japanese Patent Application Unexamined Publication No. 08-255432, the alternation processing of the defective sectors is the skip processing. Thus the above-described problem with the head movement arises. Moreover, in Japanese Patent Application Unexamined Publication No. 11-134809, the alternation processing of the defective sectors is the slip processing, however, it is necessary to allocate the user data area and the spare area(alternation area) alternately in the storage area in advance.

SUMMARY OF THE INVENTION

Accordingly, it is an object of the present invention to provide a disk unit suitable for recording and reproducing time-series continuous data such as AV data.

In order to achieve the above-described object, in the present invention, when data received to be written into the recording medium is audio and/or video data, which is called AV data hereinafter, address information specifying a beginning sector of the recording medium in which the data has been written is registered in control information storage means.

At this time, it may be so constructed that the AV data received to be recorded is judged whether or not it is contiguous with the AV data written just before, and if contiguous, the beginning sector is not registered in the control information storage means.

Also, in the present invention, when data received to be written into the recording medium is AV data and a sector of the recording medium in which the data is to be written is defective, the data to be written into the defective sector is written into a sector which is physically contiguous with the defective sector and is not defective.

At this time, even when the other AV data has been already written in the sector which is physically contiguous with the defective sector and is not defective, overwriting the data may be performed so that the sectors in which AV data is written may be physically contiguous as much as possible.

At this time, when an attribute of the other AV data to be overwritten is the attribute which prohibits overwriting, it may be so constructed that the other AV data may not be overwritten. Further, it may also be so constructed that overwriting is not performed on the sectors which are at a predetermined number from the beginning address of the other AV data to be overwritten.

Furthermore, in order to determine whether it is a defective sector or not, when data is read from the recording medium, it may be so constructed that sectors having a number of corrections which is larger than a predetermined boundary value E2 are registered in a second defective sector storage part, and sectors having a number of corrections which is larger than a predetermined boundary value E1, which is not greater than E2 are registered in a first defective sector storage part. With this arrangement, by referring to the defective sector storage parts, it is possible to determine whether or not the sector is defective for writing AV data.

Moreover, in the present invention, when data read from the recording medium is the AV data, if the data contains errors of more than a limit value which can be corrected by correction means or more, uncorrected data or a predetermined fixed value may be transferred to the host in place of the read data. With this arrangement, when reading the AV data, even a sector with defects can be used continuously.

BRIEF DESCRIPTION OF THE DRAWINGS

FIG. 1A is a schematic diagram illustrating the relationship between a head movement and sectors when reading AV data from the recording/reproducing apparatus according to an embodiment of the present invention;

FIG. 1B is a schematic diagram illustrating the relationship between a head movement and sectors when writing AV data in the recording/reproducing apparatus according to an embodiment of the present invention;

FIG. 2A is a schematic diagram illustrating the skip access processing of the conventional recording/reproducing apparatus;

FIG. 2B is a schematic diagram illustrating the slip access processing of the conventional recording/reproducing apparatus;

FIG. 5 is a flowchart illustrating the control operation of the recording/reproducing apparatus according to an embodiment of the present invention;

FIG. 6A is a flowchart illustrating write command interpretation processing of the recording/reproducing apparatus according to an embodiment of the present invention;

FIG. 6B is a. flowchart illustrating operations of the read command interpretation processing of the recording/reproducing apparatus according to an embodiment of the present invention;

FIG. 7A is a flowchart illustrating the change command interpretation processing which allows overwriting of the content (a file) of the recording/reproducing apparatus according to an embodiment of the present invention;

FIG. 7B is a flowchart illustrating the change command interpretation processing which prohibits overwriting of the content (a file) of the recording/reproducing apparatus according to an embodiment of the present invention;

FIG. 8A is a flowchart illustrating the division specification command interpretation processing of the content (a file) of the recording/reproducing apparatus according to an embodiment of the present invention;

FIG. 8B is a flowchart illustrating the combination specification command interpretation processing of the content (a file) of the recording/reproducing apparatus according to an embodiment of the present invention;

FIG. 9A is a flowchart illustrating the concatenation specification command interpretation processing of the content (a file) of the recording/reproducing apparatus according to an embodiment of the present invention;

FIG. 9B is a flowchart illustrating the concatenation cancel specification command interpretation processing of the content (a file) of the recording/reproducing apparatus according to an embodiment of the present invention;

FIG. 10 is a flowchart illustrating the response time specification command interpretation processing of the recording/reproducing apparatus according to an embodiment of the present invention;

FIG. 14 is a flowchart illustrating the registration processing of file control information 402 of the recording/reproducing apparatus according to an embodiment of the present invention;

FIG. 16A is a schematic diagram illustrating the structure before rewriting the content #01, in which a defective sector has occurred, of the recording medium 301 in the recording/reproducing apparatus according to an embodiment of the present invention;

FIG. 16B is a schematic diagram illustrating the structure after rewriting the content #01, in which a defective sector has occurred, of the recording medium 301 in the recording/reproducing apparatus according to an embodiment of the present invention;

FIG. 17A is a schematic diagram illustrating the structure before rewriting the content #01, in which a defective sector has occurred, of the recording medium 301 in the recording/reproducing apparatus according to an embodiment of the present invention;

FIG. 17B is a schematic diagram illustrating the structure after rewriting the content #01, in which a defective sector has occurred, of the recording medium 301 in the recording/reproducing apparatus according to an embodiment of the present invention;

FIG. 21A is a schematic diagram illustrating the alternation processing of the defective sector 103 of the recording medium 301 when writing PC data in the recording/reproducing apparatus according to an embodiment of the present invention; and FIG. 21B is a schematic diagram illustrating the alternation processing of the defective sector 103 of the recording medium 301 when writing AV data and the structure of the defective sector table in the recording/reproducing apparatus according to an embodiment of the present invention.

DESCRIPTION OF THE PREFERRED EMBODIMENT

The recording/reproducing apparatus according to an embodiment of the present invention is described in the following. In this regard, in the following description, streaming data, which is time-series continuous and has a relatively large volume, such as audio and video data, etc. is called "AV data". Also, data, which has a relatively small volume but needs completeness, such as the data used for the conventional personal computer (PC) is called "PC data". Further, the data to be recorded or read is called "content".

Figure 15:
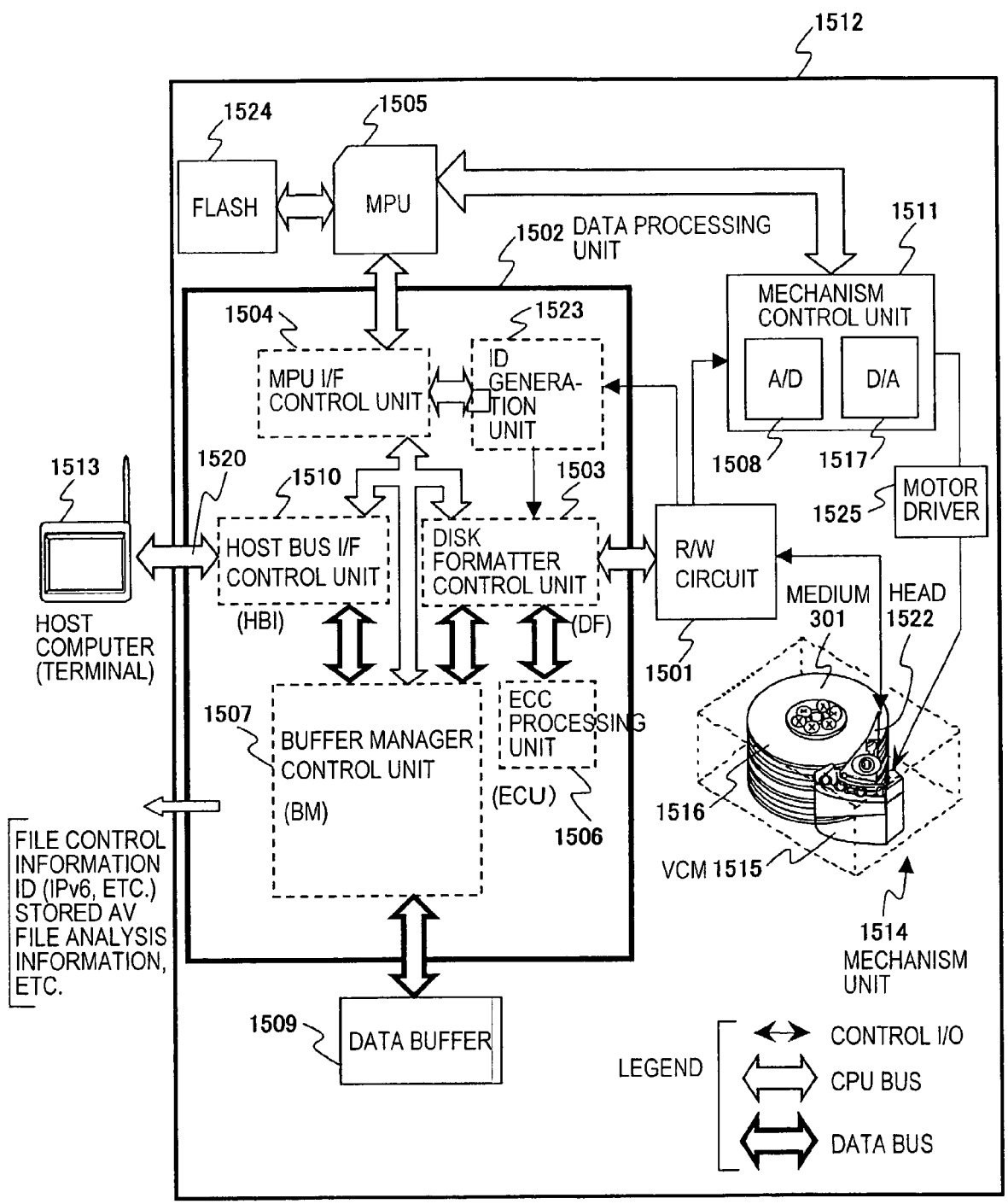
FIG. 15 is a block diagram illustrating the structure of the recording/reproducing apparatus according to an embodiment of the present invention.

First, the configuration of the recording/reproducing apparatus 1512 according to an embodiment of the present invention will be described with reference to FIG. 15. The recording/reproducing apparatus 1512 is connected to a host computer or a terminal (hereinafter referred to as a host) 1513 via a standard interface bus 1520, for example, an IDE, etc. The recording/reproducing apparatus 1512 includes a mechanism unit 1514, a mechanism control unit 1511 which controls the mechanism unit 1514, a recording/reproducing (R/W) circuit 1501, an MPU 1505, a flash memory 1524, a data processing unit 1502, and a data buffer 1509.

The mechanism unit 1514 includes a recording medium (hard disk) 301, a magnetic head 1522, a VCM (Voice Coil Motor) 1515 for driving the magnetic head 1522, a spindle motor 1516 for rotating the recording medium 301, and a motor driver (not shown in the figure) for controlling rotation driving of the VCM 1515 and the spindle motor 1516.

The data processing unit 1502 has a host-bus interface control unit (HBI) 1510 which is connected to the host computer 1513 via an interface bus 1520, an MPU interface (I/F) control unit 1504 which is connected to the MPU 1505, a disk formatter control unit 1503 which is connected to the R/W circuit 1501, and a buffer-manager control unit (BM) 1507 which is connected to the data buffer 1509. In addition to this, the data processing unit 1502 is provided with an ID generation unit 1523 and an ECC processing unit 1506, etc.

Figure 4:
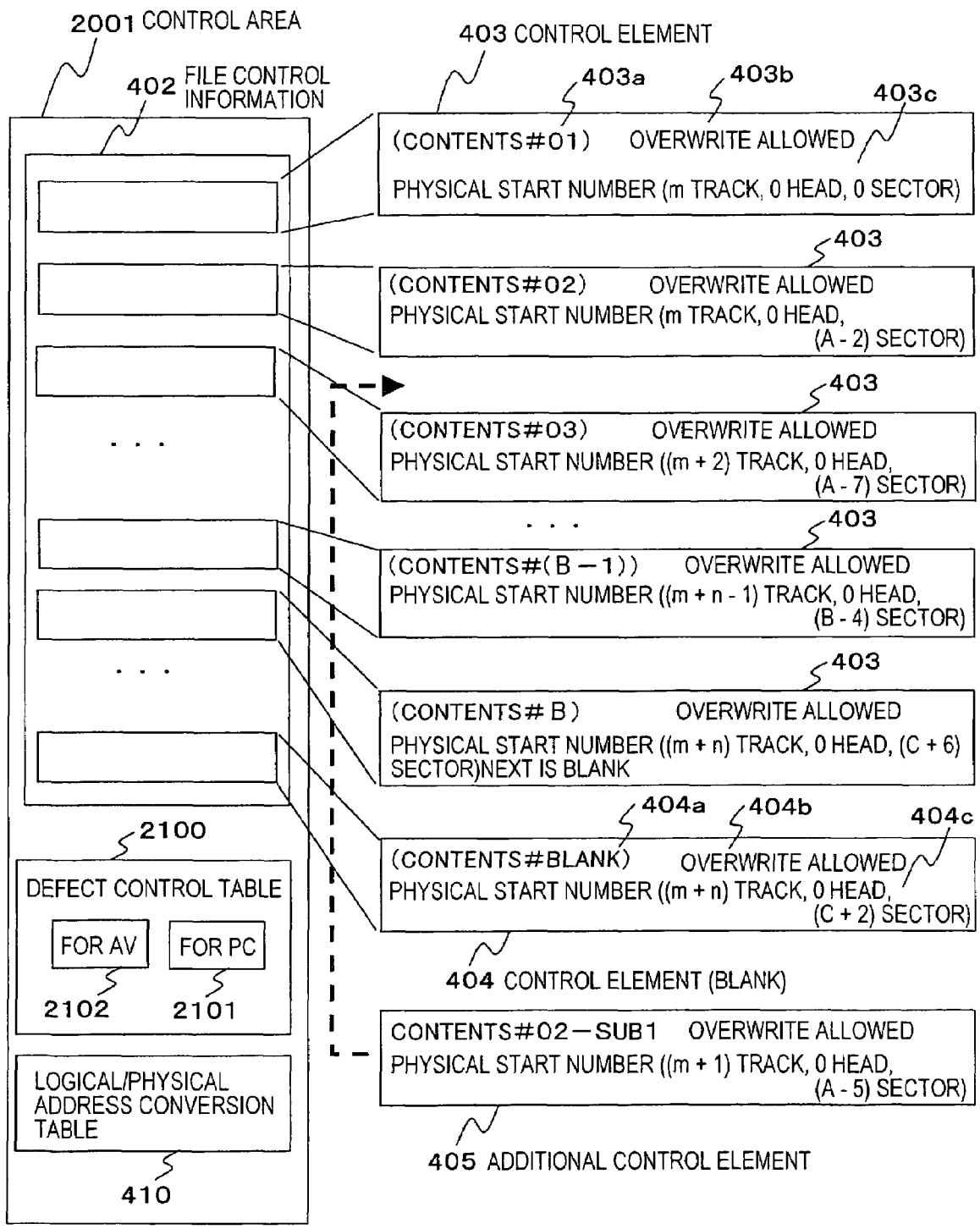
FIG. 4 is a schematic diagram illustrating the structure of a control area 2001 of the recording/reproducing apparatus according to an embodiment of the present invention.
Figure 20:
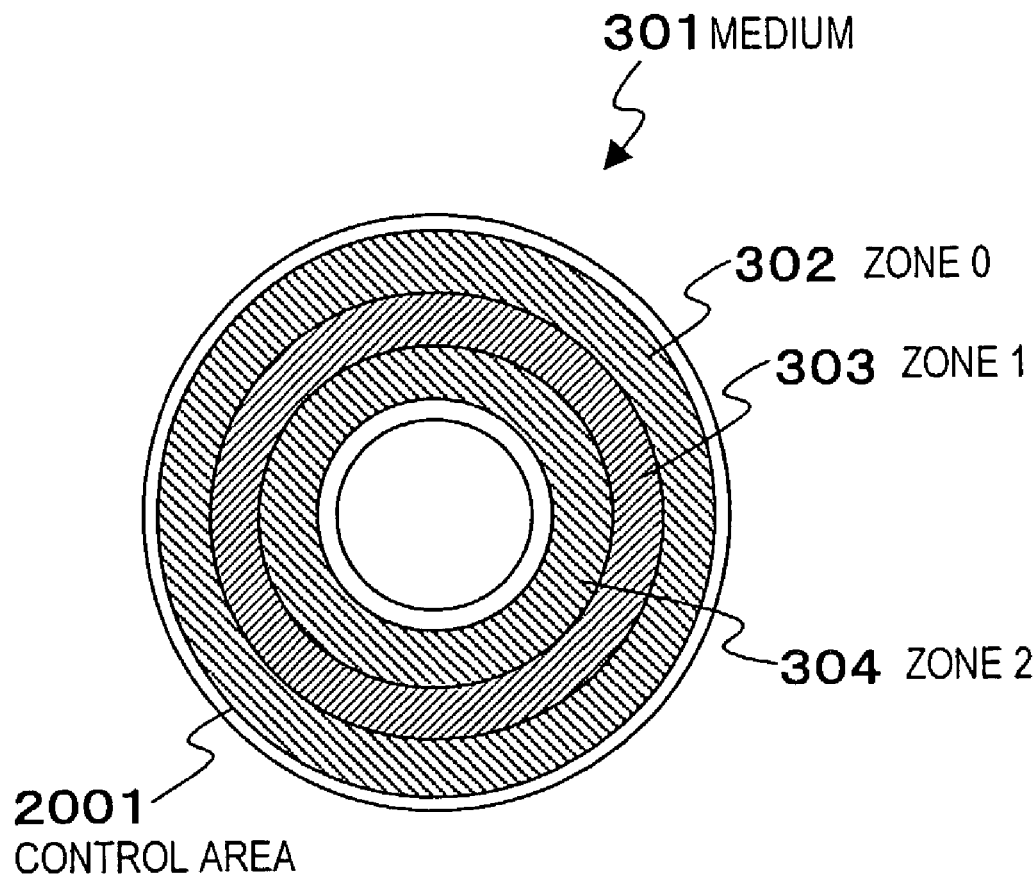
FIG. 20 is a schematic diagram illustrating the zone structure and the control area 2001 allocation in the recording medium of the recording/reproducing apparatus according to an embodiment of the present invention.

The non-volatile storage area under the control of the MPU 1505 in the recording/reproducing apparatus 1512 is provided with a control area 2001. Specifically, the control area 2001 is disposed in the flash memory 1524 or, as shown in FIG. 20, for example, the outermost circumference of the recording medium 301 (refer to FIG. 20). In the following description, an example in which the control area 2001 is disposed in the outermost circumference of the recording medium 301 will be described. In the control area 2001, as shown in FIG. 4, file control information 402, a defect control table 2100, and a logical/physical address conversion table 410 are stored. A detailed description will be given later of the structures of the file control information 402 and the defect control table 2100.

Next, the operation of the recording/reproducing apparatus 1512 will be described using flowcharts, such as FIG. 5, for example.

Before directing the recording/reproducing apparatus 1512 to perform the operation of recording and reproducing data, the host 1513 takes out the file control information 402 (refer to FIG. 4) stored in the control area 2001 of the recording medium 301, and comprehends the data stored in the recording medium 301 from the file control information 402. For this purpose, the host 1513 sends a command which directs to transfer the file control information 402 to the recording/reproducing apparatus 1512 in accordance with the interface protocol. The recording/reproducing apparatus 1512 receives the command in the HBI 1510 in step 221 in FIG. 5, and transfers it to the MPU 1505. The MPU 1505 interprets the received command, and if the command is determined to be a command for directing transfer of the control information 402, the processing goes to step 226.

In step 226, the MPU 1505 directs the mechanism control unit 1511 to read servo-sector data of the recording medium 301 for positioning the magnetic head 1522 in order to read data in the control area 2001 in the outermost circumference of the recording medium 301. The mechanism control unit 1511 controls the motor driver (not shown in the figure) of the mechanism unit 1514, and positions the magnetic head 1522 to the corresponding track of the recording medium 301. The servo sector data read from the recording medium 301 for positioning the head is taken in the ID generation unit 1523 as serial pulse data via the R/W circuit 1501. Here byte sync is detected, and serial-parallel conversion is performed based on this. Here if the servo ID is read correctly and the data sector storing the corresponding control information 2001 is found, the magnetic head 1522 reads the data in the file control information 402. The read data is transferred to the disk formatter control unit 1503 via the R/W circuit 1501, received error correction in the ECC processing unit 1506, and transferred to the host computer 1513 via HBI 1510.

Thus the host computer 1513 can comprehend the contents of the file control information 402, and can direct to record (write) or reproduce (read) data. In this regard, when fetching the file control information 402, it can be so constructed that the host 1513 fetches the ID information in order to identify the recording/reproducing apparatus 1512. For the ID information, an IP address, etc. of IPv6 (Internet Protocol version 6) which has been stored in advance in the non-volatile storage area (for example, the flash memory 1524 and the recording medium 301) in the recording/reproducing apparatus 1512 can be used.

Also, when the host 1513 directs the recording medium 301 of the recording/reproducing apparatus 1512 to record (write) or reproduce (read) data, the host 1513 sends commands for directing it to the recording/reproducing apparatus 1512 in accordance with the interface protocol. The MPU 1505 of the recording/reproducing apparatus 1512 determines if the command is a command for directing recording (writing) or a command for directing reproducing (reading) in step 221 in the above-described FIG. 5. If the received command is determined as a write command, the processing goes to step 222 in FIG. 5, and the command specification contents is interpreted. Further, if the received command is determined as a read command in step 221, the processing goes to step 224 in FIG. 5, and the command specification contents is interpreted.

A description will be further given of the processing of the write command contents interpretation in step 222 using FIG. 6A.

First, as a prerequisite, a description will be given of the structure of a write command issued by the host 1513. The write command issued by the host 1513 has a section which specifies whether the command is PC data write command or AV data write command. If the command is the PC data write command, it includes a section which specifies a data-write start address and a section which specifies the number of write sectors. On the other hand, if the command is the AV data write command, it includes a section which specifies a response time of the recording/reproducing apparatus 1512, a section which specifies whether overwriting AV data with another AV data is allowed, and a section which specifies whether there is continuity between the write command sent immediately before and the present write command, which means that whether the data to be written by the present write command is continuous with the data written by the last write command. If there is no continuity with the last data, the command includes a section which specifies a write start address in the same way as PC data. Also, if there is continuity with the last data, the command does not include a start address specification, but includes a section which specifies whether writing (addition) should be made continuously with the last data. With this addition specification, when accessing continuous data, the host 1513 does not specify the start address, but only specifies addition, and data can be written into the next sector to the last sector in which data has been written just before. Also, in the case of AV data write command, the command includes a section which specifies the number of write sectors just like the case of PC data command.

Specification of continuity of AV data can be performed in the following manner: the host 1513 by providing an ID such as a number or a code, etc. identifying the recorded data content and the recording/reproducing apparatus 1512 determines if there is data continuity by determining whether the content ID is continuous with the content ID of the data written just before, in addition to providing a section which specifies information of whether there is continuity or not in the command.

In this regard, the host 1513, of course, can issue the command including the above-described contents as one command one time. However, the command can be divided into a plurality of commands, such as a command for specifying a response time beforehand, a mode specification command which specifies AV data or PC data.

The MPU 1505, which received such a command, as shown in FIG. 6A, interprets the relevant section of the write command, and the processing goes to either step 61 or step 63 depending on the command which is either the PC data write command or the AV data write command. If the command is the PC data write command, specification of a write start address and the number of write sectors are read (step 62 and step 67). If the command is AV data write command, the contents of a response time specification section, and a continuity specification section of a command are individually read (step 64 and step 65). If the continuity is not specified by the continuity specification, the contents of the specification of whether the other AV data can be overwritten on the present AV data is read (step 68), and the write start address and the number of write sectors are read (step 62 and step 67). Also, if continuity is specified in step 65, information of whether addition specification or there is a write start address specification is read, and the number of write sectors are read (step 66 and step 67). By the above, the write command interpretation step 222 is completed, and the processing goes to step 223 in FIG. 5 to perform the write processing.

At the same time, if the command received from the host 1513 in step 221 in FIG. 5 is the read specification command, the command interpretation is performed in step 224. The read command sent from the host 1513 includes the same contents as those of the write command except for the specification of read or write.

The MPU 1505, as shown in FIG. 6B, interprets the relevant section of the read command, and the processing goes to each processing (step 68 or step 70) depending on the command, which is either the PC data read command or the AV data read command. If the command is the PC data read command, specification of a read start address and the number of read sectors are read (step 69 and step 74). On the other hand, if the command is AV data read command, a response time specification section, a d continuity specification section, specification of whether there is continuous reading or not in the case of having continuity, and specification of the number of read sectors are read in steps 71 to 74. By this operation, the read command interpretation step 224 in FIG. 5 is carried out, and the processing goes to step 225 to perform the read processing.

Here a description will be given of the write processing in step 223 using the flowchart in FIG. 19.

Figure 19:
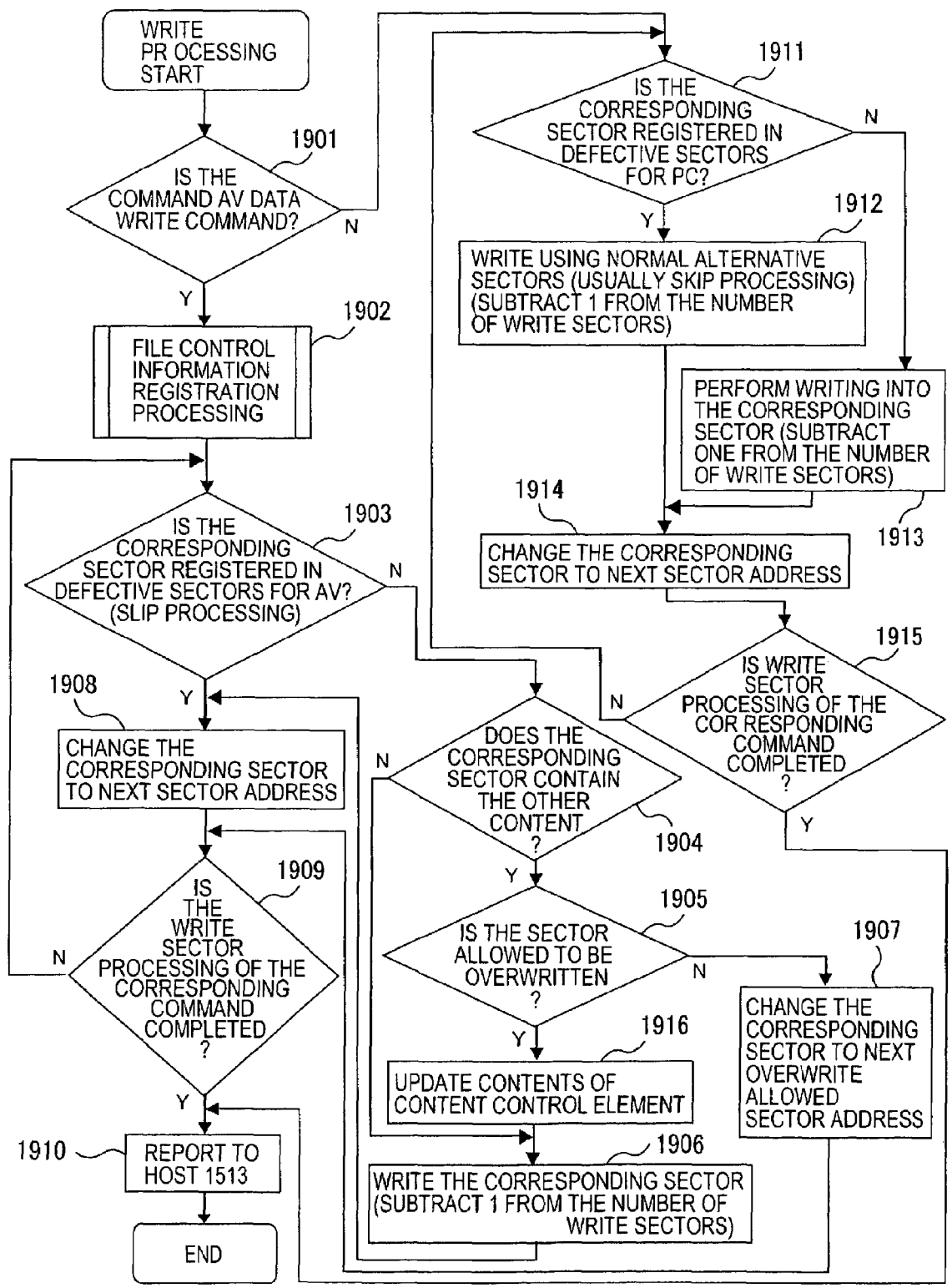
FIG. 19 is a flowchart illustrating the write processing of the recording/reproducing apparatus according to an embodiment of the present invention.

First, in the write processing, the MPU 1505 determines whether the write command is for AV data or for PC data in step 1901 in FIG. 19. Specifically, in step 1901, by referring to the command interpretation in step 222 in FIG. 5, it is determined whether the command is the AV data write command or not. If the command is for AV data, the processing goes to step 1902, and the beginning address number of the AV file to be written is registered in the file control information 402 in the file control area 2001 as a control element 403. In step 1902, as shown in FIG. 14, the MPU 1505 determines whether the AV data write command has the continuous address with that of the AV data write command received immediately before (step 1401). Here a determination of continuity is made by referring to the command continuity specification in the command interpretation in step 65 in FIG. 6A. If it has been specified that there is continuity, step 1902 is completed directly, and registration of the file control information 402 is not carried out. If it has been specified that there is no continuity in step 65, the command is determined to be a new AV data write command, and a new control element 403 is written in the file control information 402 of the control area 2001 in FIG. 4 in step 1402. Consequently, the recording/reproducing apparatus can easily register the beginning address of the AV data in the control area. As shown in FIG. 4, the contents registered as the control element 403 includes a beginning address (a track number, a head number, and a sector number) 403*c* of the AV data to be written, "overwrite allowed (or prohibited)" 403*b* which indicates whether overwriting by the other data is allowed, and "content #XX" 403*a* which indicates a control element number. In this regard, the beginning address 403*c* of the AV data is the write start address interpreted in the command interpretation step 62 in FIG. 6A. In an example in FIG. 4, the write start logical address specified in the command by the host 1513 is converted to a physical address by the MPU 1505, and registered as the beginning address 403*c* in the control element 403. For conversion from a logical address to a physical address, the MPU 1505 refers to the logical/physical address conversion table 410 which indicates the correspondence between the logical address and the physical address in the control area 2001. Also, a control element 404 ("content #BLANK" 404*a*) in FIG. 4 is a control element that indicates the beginning address 404*c* of free space of the recording medium 301. When writing in a free space is necessary, registration has been made so that the control element 404 can be referenced. In this regard, the control element 404 is always registered as "overwrite allowed" 404*b*. Further, "content #XX" 403*a* and "content #BLANK" 404*a* which indicate a number of control element content are registered for the content of the control element 403 to be easily understood, however, an actual file control can be carried out without them, thus when it is necessary to keep the capacity of the file control information 402 small, registration of such information can be omitted.

Figure 3:
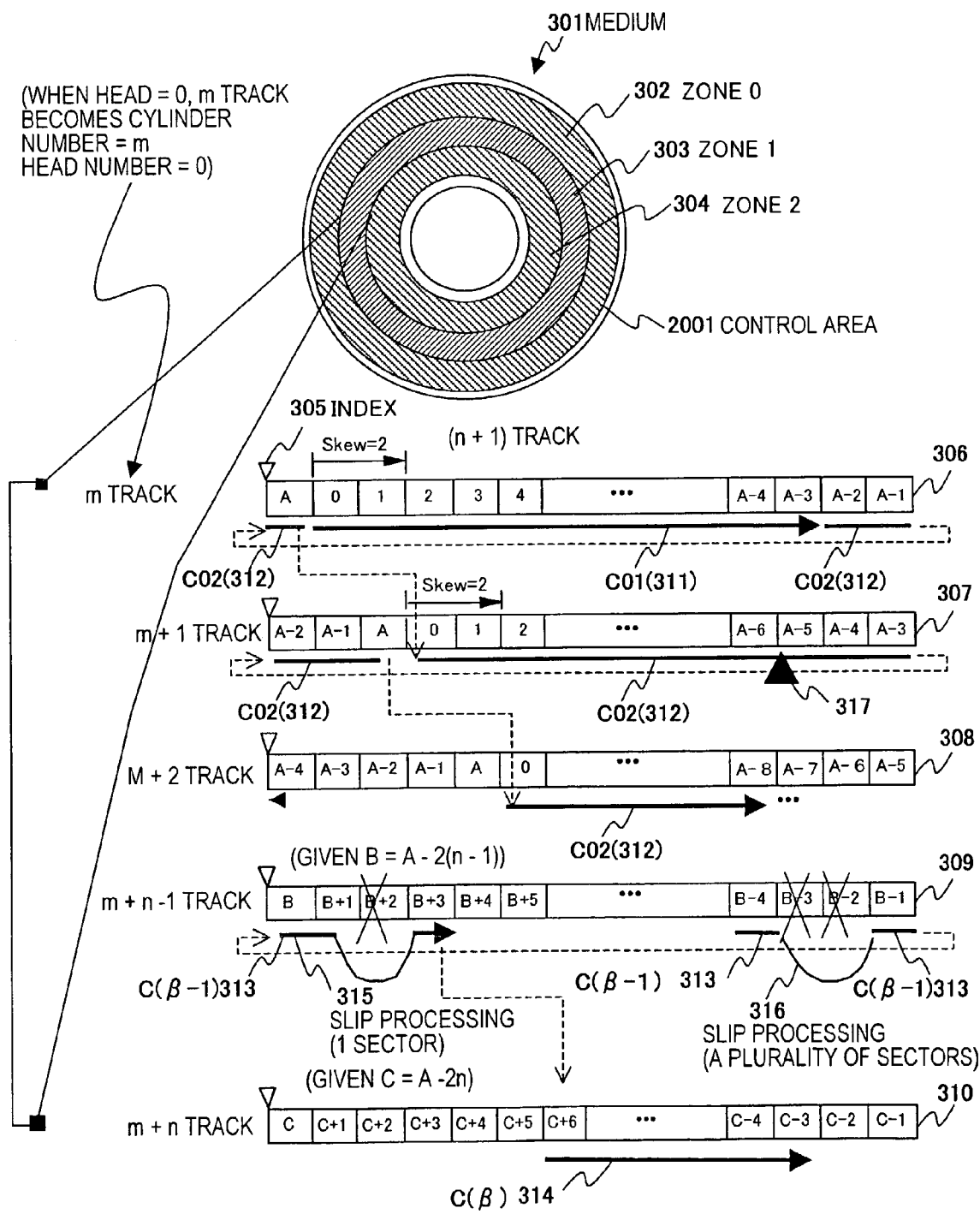
FIG. 3 is a schematic diagram illustrating the zone structure and the content structure recorded in sectors of each track of the recording medium 301 of the recording/reproducing apparatus according to an embodiment of the present invention.

A description will be given of the relationship between the registered file control information 402 in FIG. 4 and the AV data on the recording medium 301 using FIG. 3. In an example in FIG. 3, the recording medium 301 has zones 0 (302) to 2 (304) as data storage areas. Here, by a head 0 of the head 1522 of the data tracks in zone 1 (303), AV data contents, that is, contents #01 (311) to #β (314) are stored in from m track (306) to m+n track (310), as shown in FIG. 3. The numbers of data sectors per track is A+1sectors, which are from 0 to A. For example, the contents #01 (311) is recorded from m track 0 sector to A−3 sector. The contents #02 (312) is recorded from m track A−2 sector to m+2 track A−8 sector. The beginning physical addresses from the contents #01 (311) to the contents #β (314) are all registered as a beginning address 403*c* of a control element 403 as shown in FIG. 4 in the above-described step 1402 in FIG. 4.

In this way, when the file control information 402 has been registered in step 1902 in FIG. 19, the processing goes to step 1903, and checking is performed whether a physical address (sector) in which the AV data is to be written is registered in an AV data defective sector table of a defect control table 2100 in the control area 2001 shown in FIG. 4. Beginning physical addresses are physical addresses which have been converted from beginning logical addresses specified in step 62 in FIG. 6A by referring to the logical/physical address conversion table 410 and the defect control table 2100. In this regard, when addition is specified in step 66 in FIG. 6A, a next address to the last physical address written just before is set to a beginning address.

In the present embodiment, as described later, at reading processing, checking is made whether the sector can be used for writing AV data or it can be used for writing PC data, and the result is registered onto an AV data defective sector table 2102 and PC data defective sector table 2101. Thus at write processing, in step 1901, it is determined whether the write command is for AV data or PC data. By using the AV data defective sector table 2102 for AV data and the PC data defective sector table 2101 for PC data, defect processing suitable for AV data and PC data can be achieved. Therefore, in step 1903, if a physical address to which writing is performed from now is not registered in the AV data defective sector table 2102, the processing goes to step 1904. In step 1904, it is checked whether the corresponding sector contains the other content from the control element 403 of the file control information 402. If it does not contain the other content (that is, current content and overwrite allowed), the processing goes to step 1906, write the corresponding sector, then one is subtracted from the number of sectors which needs to be written, and the processing goes to step 1908. In step 1904, if it contains the other content, the processing goes to step 1905, and it is determined whether the corresponding sector is allowed to be overwritten or not from the control element 403 of the file control information 402. If overwriting is allowed, the processing goes to step 1916, the contents of the control element of the current content is updated, and then the processing goes to step 1906. Then the same processing as that of the case when the corresponding sector does not contain the other content is performed. When overwriting is prohibited in step 1905, the processing goes to step 1907, the current sector is changed to the next sector address which is allowed to be overwritten, and the processing goes to step 1909. In step 1908 and after, the corresponding address is changed to the next sector address, and then in step 1909, it is determined whether direction from the host 1513 to the recording/reproducing apparatus 1512 is completed or not. If completed, the processing goes to step 1910 in order to report completion to the host 1513, and then the processing is completed after the step 1910. If sector-write processing continues in step 1909, the processing returns to step 1903, and the above-described processing is repeated.

Here a detailed description will be further given of important steps for operation. In step 1903, when a physical address of the sector in which writing is to be performed is registered as defective in the AV data defective sector table 2102, the defective sector is not used, and checking operation of whether the next physical address sector is registered as defective in the AV data defective sector table 2102 is repeated in steps 1908, 1909, and 1903. If it is not registered as defective, after determining writing in step 1904 and subsequent steps, writing the sector is performed if there is no problem. This corresponds to the conventional slip processing. However, in the present embodiment, a feature is in that, the slip processing is performed, and even when the next sector in which the data is to be written contains another content, if "overwrite allowed" 403b is registered in the control element 403 of the file control information 402 with respect to the content, overwriting is allowed from the beginning of another content. Thus, in FIG. 19, if the corresponding sector is not registered as a defective sector for AV data, in step 1904, MPU 1505 determines whether the corresponding sector contains the other content or not. This determination is made by referring to the beginning physical address 403c of the control element 403 in the file control information 402. If the defective sector contains the other content, in step 1905, the control element 403 is checked whether it has "overwrite allowed" 403b or "overwrite prohibited" 403b. If "overwrite allowed" 403b, the processing goes to step 1906, and writing into the corresponding sector can be made.

Also, in step 1905, when the case where the next content is "overwrite prohibited" 403b continues, writing is performed in the beginning physical address 404c of contents #BLANK of the control element 404 which is free space. In this case, the beginning physical address 404c of contents #BLANK of the control element 404 is shifted by one and rewritten. After that, the processing goes to step 1910, and until writing into all the sectors specified by the command in steps 62 and 67 in FIG. 6A is completed, the processing in steps 1903 to 1909 are repeated. When writing into all the sectors specified by the writing command in FIG. 6A, the processing goes to step 1910, and a command for reporting the end of writing is sent to the host 1513.

On the other hand, in step 1901, when the write command is for PC data, the processing goes to step 1911, it is determined whether the physical address corresponding to the write start logical address of step 62 in FIG. 6A is registered as defective in the PC defective sector table 2101 on the defect control table 2100 in FIG. 4. If the sector of the corresponding physical address is registered as a defective sector, the processing goes to step 1912, the defective sector is not used, and writing is performed into a reserved sector prepared for alternation in advance by skip processing. Then one is subtracted from the number of write sectors, and the processing goes to step 1914. Also, in step 1911, when the sector is not a defective sector, writing is performed in the corresponding sector. Then one is subtracted form the number of write sectors, and the processing goes to step 1914. Next, the address of the corresponding sector is updated by the address of a next sector. Here the address of the next sector is a return address of the skip processing in the case of coming from step 1912. Until writing into all the sectors specified by the write command in FIG. 6A is completed, steps 1911 to 1915 are repeated. When writing into all the sectors is completed, the processing goes to step 1910 and reporting is performed to the host 1513.

In this way, in the write processing according to a present embodiment, when writing data is AV data, the defect processing is performed by slip processing, whereas when writing data is PC data, the defect processing is performed by skip processing. Thus AV data can be written into contiguous sectors as much as possible. It is therefore unnecessary to reciprocate a head to a reserved sector for skip processing as is done conventionally, thus AV data can be read and written in a short response time. Also, for PC data, data correctness can be ensured by skip processing. For example, in the case of AV data, suppose that the number of sectors of the content for overwriting this time is the same as the number of sectors of the content on which overwriting is performed, if there is a defective sector, the last sector of the data is written into the beginning sector of the next physically subsequent content as many sectors as the number of sectors shifted. Thus AV data can be written into physically contiguous sectors. By this, the data of the beginning two sectors of the next succeeding content is broken. However, since AV data is continuous data, the data content is not much influenced by the data of the next succeeding sector data. This means that the beginning part of reproducing image only gets out of order somewhat, but the content of the AV data is not impaired so much. Furthermore, the content of which the beginning sector data is broken is the data having "overwrite allowed" 403b in the control element 403, thus no problem arise for the user. For the content which is registered as "overwrite prohibited" 403b in the control element 403, in step 1905, the processing goes to step 1907 so that the beginning sector is not overwritten, and thus the data can be protected. In the present embodiment, a description has been given of the case where AV data is processed by slip processing and PC data is processed by skip processing in order to explain the operation of the recording/reproducing apparatus 1512. However, it is of course usual for PC data to be searched for a defective sector in order to be processed by slip processing before factory shipping. It is therefore all right for the sectors of PC data to be processed by slip processing as done in the conventional manner.

Next, a description will be given of the operation for updating AV data by the write processing in the above-described FIG. 19 with specific examples using FIGS. 16A, 16B, 17A, and 17B.

FIG. 16A shows an example in which content 01 (1605) and content 02 (1606), which are AV data, are written into three tracks from track m (1601) to track m+2 (1603) on the recording medium 301, and from the physical address number A–7 of track m+2 is the content BLANK (1607). Both the content 01 (1605) and 02 (1606) are data for which "overwrite allowed" 403b is registered in the control element 403. Suppose that in sector 1608 of physical address number 3 of track m in which the content 01 (1605) is written, a subsequent defect has occurred, and the defect is registered in the AV data defective sector table 2102. Now, suppose a rewrite direction of the content 01 (1605) is received from the host 1513, and the number of sectors after rewriting is the same as that the number of sectors before rewriting. In this case, in the subsequent defective sector 1608 of physical address number 3 in track m, since slip processing is performed in step 1905 in FIG. 19, the last data of the content 01 (1605) updates the beginning sector (physical address number A–2 of track m) of the content 02 (1606) in step 1916 (refer to FIG. 16B). Thus although a defective sector 1608 has occurred, the content 01 (1605) after rewriting can be written into contiguous sectors as one stream (a piece of data). Accordingly, when reading the content 01 (1605), there is no need to move the head among tracks, thus data can be read in a short response time.

On the other hand, in FIG. 17A, the content 01 (1605) and the content 02 (1701) are written as is the case in FIG. 16A. However, suppose that the content 02 (1701) is the data which is registered as "overwrite prohibited" 403b in the control element 403. In this case, when writing the last data of the content 01 (1605), since the content 02 (1701) is prohibited to overwrite, in step 1905 in FIG. 19, the processing goes to step 1907, and writing is performed in the beginning sector of the content BLANK (1607). Thus the content 01 (1605) can be read by only one movement of the head while preventing the data of the content 02 (1701) from being rewritten.

Here a description will be given of the operation of each unit of the recording/reproducing apparatus 1512 when writing data into the corresponding sector in the above-described step 1906. The MPU 1505 directs the mechanism control unit 1511 to read the data of the servo area of the recording medium 301 in order for the mechanism unit 1514 to write data into the corresponding sector. The mechanism control unit 1511 controls the motor driver (not shown in the figure) of the mechanism unit 1514, and positions the magnetic head 1522 to the corresponding track of the recording medium 301. During this process, the host 1513 and host bus I/F control unit (HBI) 1510 temporarily stores the data to be written in the data buffer 1509 via the HBI 1510 and buffer manager control unit (BM) 1507 in accordance with the protocol.

The servo area data read from the recording medium 301 for positioning the head is fetched in the ID generation unit 1523 as serial pulse data via the R/W circuit 1501. Here byte sync detection is performed, and serial-parallel conversion is performed based on this. Here when the servo ID is read correctly, by the conventional without ID processing, the ID generation unit 1523 calculates the physical sector number from the servo ID, and transfers it to the MPU interface control unit 1504 to determine whether it is the corresponding sector. If it is the corresponding sector, data which is stored in the data buffer 1509 and is to be written is transferred from the data buffer 1509 to the disk formatter control unit (DF? ?) 1503, and is converted to NRZ (Non Return to Zero) signal. At this time, the ECC processing unit 1506 adds an ECC code which is used for data checking and correction in data reading to the data for each sector. The NRZ signal is transferred to the R/W circuit 1501, converted to analog signal, and written onto the recording medium 301.

Next, a description will be given of the read processing of step 225 in FIG. 5 using the flowchart in FIG. 18.

As already described, in step 224 in FIG. 5, the MPU 1505 interprets the read command as shown in FIG. 6B to determine whether it is the PC data read command or the AV data read command, and reads the read start address and the number of read sectors specification, etc. In step 225 in which read processing is performed, first, in step 181 in FIG. 18, the MPU 1505 positions the magnetic head 1522 to the sector to be read from the recording medium 301. The sector to be read is determined using the read start physical address which is given from the read start address (logical address) specified in the command in step 69 in FIG. 6B. In this regard, when continuous reading is specified in step 73, the corresponding sector is the next sector to the last sector of the AV data read just before. The conversion between the logical address number and the physical address number (sector) is carried out by referring to the logical/physical address conversion table 410. Also, the control method for positioning the magnetic head 1522 to the corresponding sector is the same for that of write processing described above.

Next, in step 182, the MPU 1505 directs the magnetic head 1522 to read the corresponding sector data. The read data is transferred to the disk formatter control unit 1503 via the R/W circuit 1501. If there is an error in the data, the ECC processing unit 1506 correct it using an ECC error correction code attached to the data sector. The corrected data is stored in the data buffer 1509 via BM 1507. For PC data, in the same way as the conventional manner, if the number of error corrections by ECC is larger than a predetermined number E1, it is determined that a correct data cannot be read from the sector, and the MPU 1505 reports it to the host 1513 in later step 188. At the same time, for AV data, in the present embodiment, if a correction can be made by the ECC technology, the data before correction which is temporarily stored in the data buffer 1509 is corrected. If the errors are beyond the limit of the ECC correction ability, a predetermined fixed value agreed between the host 1513 and the recording/reproducing apparatus 1512 or uncorrected data is stored in the data buffer 1509 as read data. Also, in the case of AV data, a response time is specified by the command in step 71 in FIG. 6B. Thus if reading is not completed within this response time, or the correction is not completed, a predetermined fixed value is stored in the data buffer in place of the read data.

Next, in the next steps 183 to 187, the MPU 1505 determines whether or not the sector should be registered as a defective sector. At this time, in the present embodiment, it is determined whether the sector is a defective sector for PC data, or a defective sector for AV data, and then the sector is individually registered in different defective sector tables 2101 and 2102. First, in step 183, a determination is made whether an error has been corrected during the read operation in step 182. If there has been no error correction, the sector is not a defective sector, thus the processing returns to step 181 directly. If an error correction has been performed in step 184, it is determined whether or not the number of error corrections is over a predetermined limit number, E1, for PC data error. This error limit number E1 is a predetermined value which is smaller than the limit number of errors that can be corrected by the ECC technology. E1 is used as a criterion for determining that it is getting dangerous to continue to use that sector as a sector for storing PC data which requires completeness. If the number of errors is over the number of error limit, E1, in step 185, the sector is temporarily stored in the data buffer 1509 or flash memory 1524 in order to be registered as a defective sector for PC data in the PC data defective sector table 2101.

Next, the processing goes to step 186, it is determined whether the number of errors corrected in step 184 is over a predetermined limit number of errors for AV data, E2 . This error limit number E2 is smaller than the limit number of errors which can be corrected by the ECC technology, but is a predetermined value which is larger than the limit number of errors E2 for PC data. E2 is a criterion to determine that the sector will not be used for next data writing even for AV data, because there are defects. If the number of errors is over the number of error limit, E2 in step 187, the sector is temporarily stored in the data buffer 1509 or flash memory 1524 in order to be registered as a defective sector for AV data in the AV data defective sector table 2102.

After this, the processing returns to step 181, steps 181 to 187 are repeated, for a range of sectors specified in step 74 in FIG. 6B, if read errors are not detected by the ECC processing unit 1506, the read data in the data buffer 1509 which temporarily stores data read from the medium 301 is transferred to the host 1513 via BM 1507 and HBI 1510. When a read error occurs, the ECC processing unit 1506 corrects the data for each sector, in the data buffer in which the read data including an error is temporarily stored, and transfers the sector for which correction has been completed to the host 1513. Also, even when the error correction is over the correction ability of the ECC processing unit 1506, if the command specified for reading by host is the AV read command, sector data including the data error which is determined between the host 1513 and the recording/reproducing apparatus 1512 may be transferred to the host. When reading all the sectors specified in step 74 in FIG. 6B is completed in this way, in step 188, end of reading is reported to the host 1513. Then, in step 189, the PC data defective sector and the AV data defective sector which have been temporarily stored in the data buffer 1509 or the flash memory 1524 in step 185 and step 187 are stored in the PC data defective sector table 2101 and the AV data defective sector table 2102, respectively. These tables 2101 and 2102 are disposed in the control area 2001 on the recording medium 301, thus storing is performed by writing data using the magnetic head 1522.

In this description, explanation is made assuming an ECC error, as a typical example of an error, however, errors may occur in various cases, for example, on data buses, such as the data bus from the magnetic head 1522 to the R/W circuit 1501 and DF 1503. There is, of course, no problem to carry out appropriate processing for counter operation in response to error occurrence.

By this means, for example, as shown in FIG. 21, when reading a sector 103 with a physical address A+1 on a track n of the recording medium 301 in step 182, if the number of error corrections is over E2 since this number of error corrections is also over E1, in steps 184 and 185, the physical address A+1 on the track n is stored on the PC data defective sector table 2101, and in steps 186 and 187, the same physical address A+1 on the track n is stored on the AV data defective sector table 2102. Thus when writing data next time, in steps 1903 and 1911 in FIG. 19, the defective sector tables 2101 and 2102 are referenced. As shown in FIG. 21A, when writing PC data into the sector 103 with the physical address A+1 on the track n, in step 1912 in FIG. 19, skip processing is performed, and data is written into the sector with a physical address A on the track m which is predetermined as a reserved sector. On the PC data defective sector table 2101, a alternation destination sector is registered as shown in FIG. 21. On the other hand, as shown in FIG. 21B, when writing AV data in the sector 103, in steps 1903, 1908, and 1909 in FIG. 19, slip processing is performed, and data is written into the next sector (physical address A+2) to the defective sector 103.

A specific description will be given using FIG. 1 of the operation when AV data is accessed by the read processing and write processing of FIGS. 18 and 19 of the present embodiment described above. As shown in FIG. 1A and FIG. 1B, AV data is written in and after the physical address A on the track n of the recording medium 301. At this time, the sector 103 on the physical address A+1 is slip processed by the processing shown in FIG. 21B. Of course, a logical address is not allocated. Thus subsequent AV data following to the physical address A (logical address number $\alpha$) is written in the sector with a physical address A+2 (logical address number $\alpha$+1). When reading the AV data by the processing shown in FIG. 19, since the defective sector 103 is registered on the AV data defective sector table 2102, the defective sector 103 is not accessed. After the data with the physical address A (logical address number $\alpha$) is read, the data with the physical address A+2 (logical address number $\alpha$+1) is read. Now, suppose that a flaw occurred at a position of the medium 301 in a sector 105 with a physical address A+3 (logical address number $\alpha$+2). In the case of read processing of AV data, if the sector 105 in which a flaw occurred can be corrected by the ECC technology, correction data is output, whereas if the sector cannot be corrected, a predetermined fixed value agreed between the host 1513 and the recording/reproducing apparatus 1512 or uncorrected data is output (step 182 in FIG. 18). In this regard, a determination of whether or not it is proper to use the sector 105 continuously for next writing is made in steps 184 and 186 in FIG. 18. If the number of corrections is over E1 and E2 the sector is registered on the defective sector tables 2101 and 2102 in steps 185 and 187, respectively. Also, when AV data write processing is executed, slip processing is performed in step 1905 in FIG. 19 for the defective sector 105 registered on the defective sector table 2102, the defective sector 105 becomes a sector not to be used at this point in time.

As described above, the recording/reproducing apparatus 1512 of the present embodiment is a recording/reproducing apparatus which can record (write) and reproduce (read) both AV data and PC data, and at the same time, the apparatus is configured to register the content in the file control information 402 when recording AV data. Thus the host 1513 can grasp the stored AV data. Also, when writing AV data, by the host 1513 specifying the continuity of the AV data written just before, the data is written into physically contiguous sectors. It is therefore possible to write and read continuous AV data with a small movement of a magnetic head, and thus the response time can be shortened.

Furthermore, when writing AV data if the corresponding sector contains a defective sector, the recording/reproducing apparatus 1512 of the present embodiment performs sector alternation processing by slip processing. It is therefore unnecessary to reciprocate the magnetic head as far as a reserved sector as in skip processing, thus the response time can be shortened. At that time, even when the next sector contains another content, if the content is registered as overwrite allowed, in the control element 403, overwriting is performed. Thus when rewriting AV data which has the same number of sectors as the original data, even if there is a defective sector among all the sectors, writing in physically contiguous sectors can be performed. It is therefore possible to read and write data with a small amount of magnetic head movement.

Also, in the recording/reproducing apparatus 1512 of the present embodiment, a sector to which the ECC corrections are performed a predetermined number of times or more when reading the data is registered as a defective sector. However, when reading AV data, considering that completeness required for AV data is not so high, the data which has been corrected to the limit of the ECC technology, or the fixed value data is used as read data, and thus it is not regarded that the data read error occurred. Consequently, if part of the AV data to be read by a user is written in the sectors which include defects, most of the AV data can be output to the user.

Further, in the present embodiment, when registering a defective sector, a configuration is employed in which there are provided two kinds of tables, the PC data defective sector table 2101 and the AV data defective sector table 2102, and a determination of whether a sector is defective or not is made by separate criteria (limit values E1 and E2) for PC data and AV data for individual registration. It is therefore possible to record PC data which requires high data completeness while avoiding the sectors determined to be defective by the strict criterion. On the other hand, for AV data which does not require very high data completeness, but requires a restricted response time, it is possible to record the data in physically contiguous sectors to the utmost extent.

Also, in the recording/reproducing apparatus 1512 of the present embodiment, the file control information 402 is recorded in non-volatile area in the recording and reproducing apparatus 1512. Thus when the recording/reproducing apparatus 1512 is connected to another host, the host can read the file control information 402, thereby making it possible to perform read and write operation without a problem. Moreover, in the above-described embodiment, the file control information 402, the defect control table 2100, and the logical/physical address conversion table 410 are stored in the recording medium 301. Thus when taking out the recording medium 301, and mounting it to another recording/reproducing apparatus, it is possible to perform read and write operation immediately without a problem. It is therefore possible to provide recording/reproducing apparatus having a transportable recording medium 301.

In this regard, data storage structure for the defect control table 2100, the logical/physical address conversion table 410, etc. can be represented by difference in order to make the storage area small.

In the above-described embodiment, an example has been described using the magnetic disk unit as the recording medium 301, however, it is possible to apply the apparatus to an optical disk, etc.

In this regard, in the above-described embodiment, when storing the file control information 402 in the control area 2001 of the recording medium 301, it is possible to perform the procedure in which the MPU 1505 temporarily stores the data in the data buffer 1509 via the MPU interface control unit 1504 and BM 1507, and finally stores the data in the control area 2001 of the recording medium 301.

Also, in the above-described embodiment, when writing AV data, the apparatus is constructed to overwrite the other content in steps 1916 and 1906 in FIG. 19. When video image distortion at the beginning of the other content is recognized as a problem, unit size of rewrite sector which defines data boundary area that is dependant on the storage data format just like MPEG2, is predetermined between the host 1513 and the recording/reproducing apparatus 1512. When overwriting the data on the other content in step 1906, a sector address which conforms to the unit size of rewrite sector of the data boundary is set to a physical sector address of the control element 403 for the other content that is being overwritten in step 1916. By this means, it is possible to prevent video image distortion of the next content.

Further, in the above-described embodiment, the MPU 1505 determines the continuity in step 1401 in FIG. 14. However, the apparatus can have a configuration in which the HBI 1510 is equipped with a circuit for determining continuity in place of the determination by the MPU 1505.

Furthermore, in the write processing in FIG. 19, when the other content is overwrite prohibited in step 1907, the beginning sector of a content, which is subsequent to the other content, that can be overwritten is set by referencing the control element 404 in step 1907. When there is no overwrite-allowed content, the beginning address of the control element 404 of a content BLANK is set, and writing is performed form that address. However, it can be configured that the other content which has the nearest physical sector and overwrite allowed is searched, and writing is performed from the beginning of the data.

Also, in the write processing in FIG. 19, in step 1905, it can also be so constructed that when the other content is overwrite prohibited, the overwrite-prohibited content may be moved by being copied to a rewrite-prohibited area prepared in advance, and wring is made into a space area thus freed. By this means, the sectors currently being written can be physically contiguous to one another. In this regard, the operation of moving overwrite-prohibited content to a rewrite-prohibited area prepared in advance can be performed not during rewrite processing in FIG. 19, but after the time point when the content is registered as "rewrite prohibited" in the control element 403b, and during spare time when there is no direction from the host to the recording/reproducing apparatus 1512.

Figure 18:
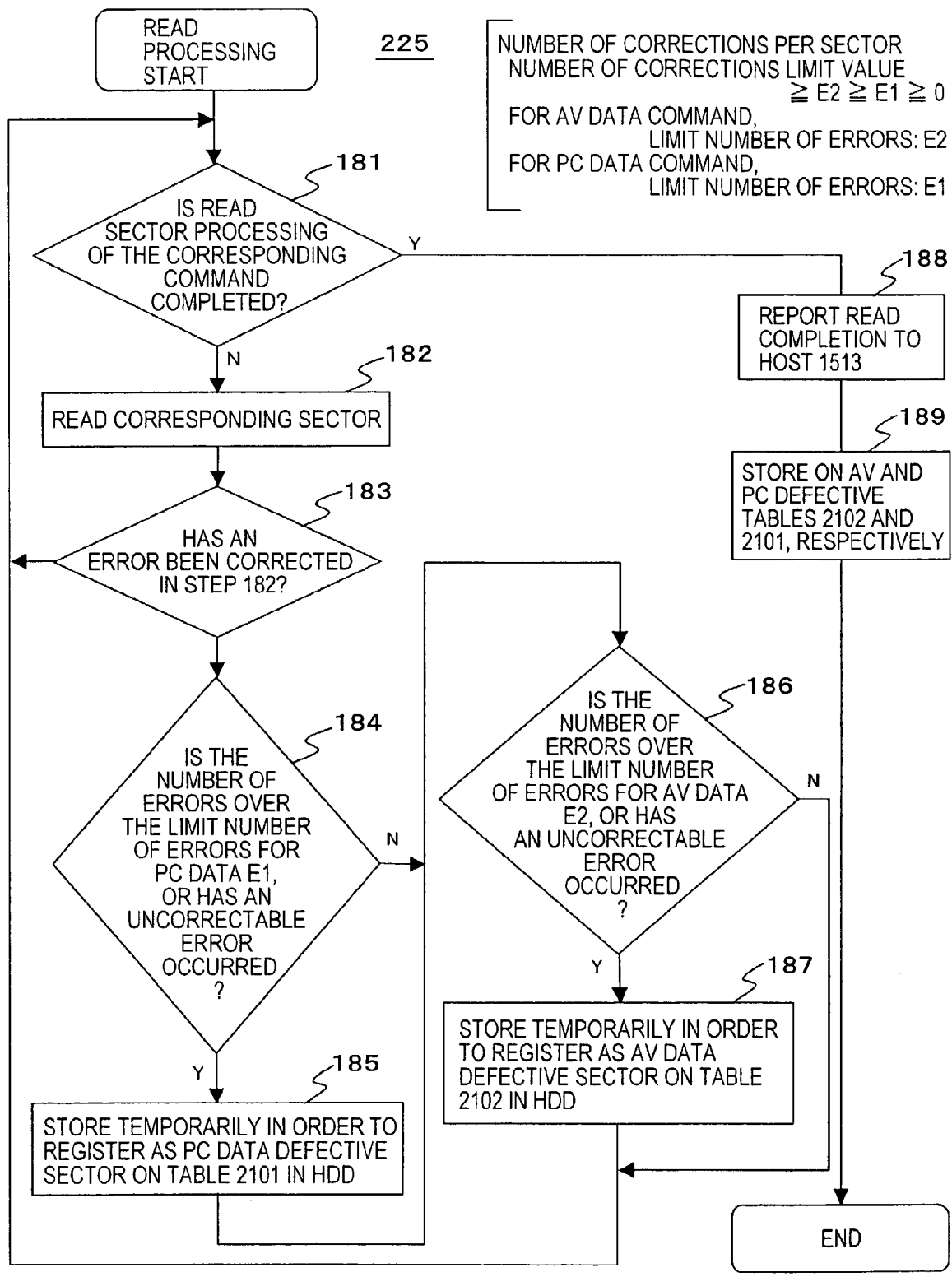
FIG. 18 is a flowchart illustrating the read processing of the recording/reproducing apparatus according to an embodiment of the present invention.

In this regard, in the read processing in FIG. 18, in steps 183 to 187, it is configured that a determination of a defective sector is made for AV data and PC data individually. However, the present invention is not limited to this. The configuration can be made. that a certain sector can be allocated exclusively for AV data or exclusively for PC data in advance by the host 1513 or by the disk unit 1512. In this case, in the flowchart in FIG. 18, for AV data, only checking whether the corresponding sector is defective sector for AV data is necessary in steps 186 and 187. At the same time, for PC data sector, only checking whether the corresponding sector is defective sector for PC data is necessary in steps 184 and 185.

Next, a description will be given of the case where a control element 405 for searching a start position is added to the file control information 402 in FIG. 4 in the recording/reproducing apparatus 1512 of the present embodiment.

For example, the address of a sector 317 (physical address (A-5) of m+1 track) of the recording medium 301 in FIG. 3 is desired by the host 1513 to be registered as a control element 405 for searching a start position as shown in FIG. 4. In this case, the MPU 1505 determines in which content the sector 317 is included. In the case of FIG. 3, the sector 317 exists in the content #02 (312). Thus the control element 405 for searching a start position is stored in an area between an area storing the control element 403 of the content #02 and an area storing the control element 403 of the content #03 in an area of the recording medium 301 for recording file control information 402. Consequently, control elements 403 of the content #03 and subsequent ones are rewritten such that written areas are shifted backwards a little. In this way, an additional control element 405 for searching a start position is written into the file control information 402 such that the element is near the content to which the address for searching a start position is included. By this processing, it is possible to achieve a recording/reproducing apparatus which is easy to find the addresses of the start position for the AV data.

Figure 11:
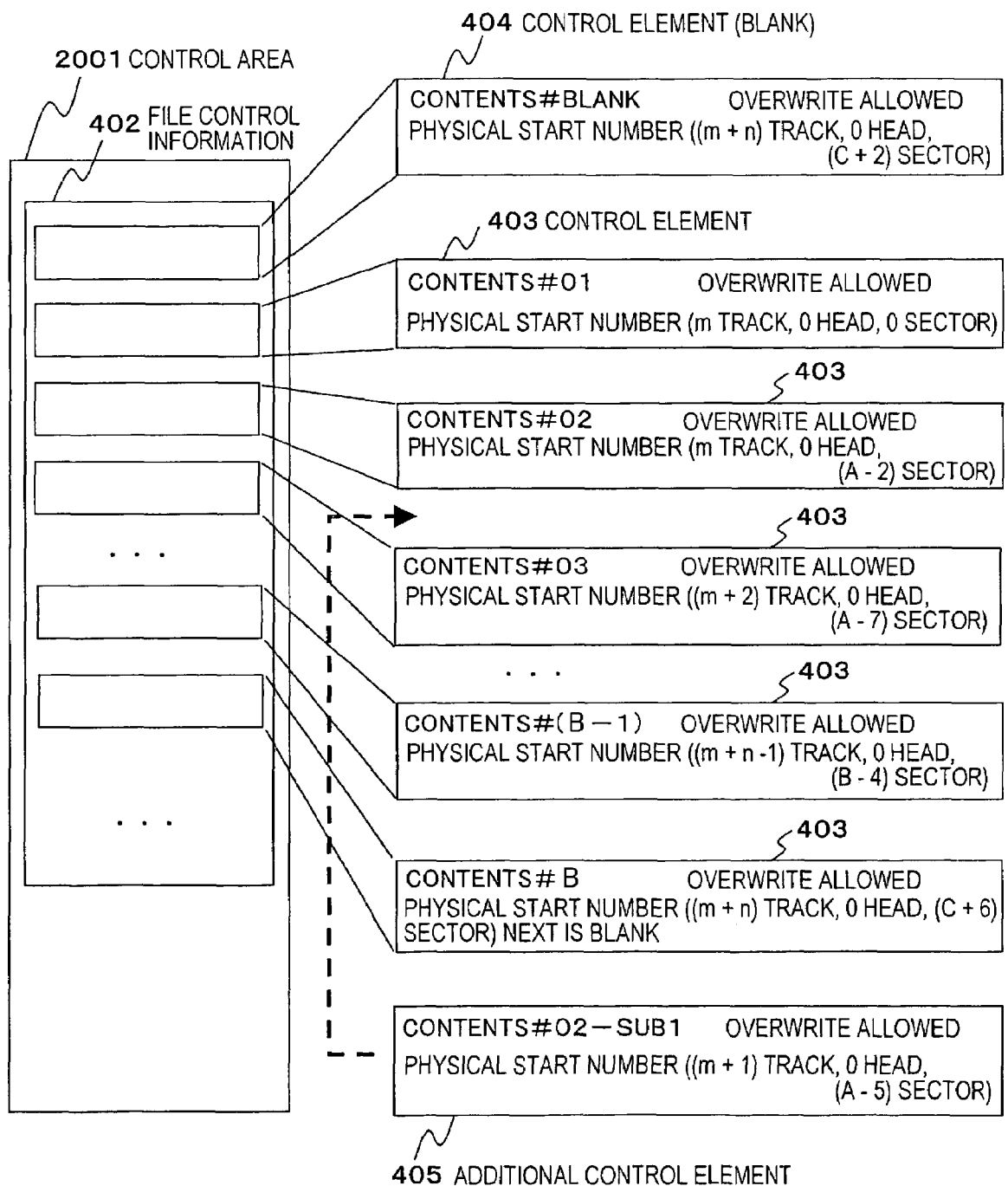
FIG. 11 is a schematic diagram illustrating the structure in which an additional control element 405 is added to the control area 2001 of the recording/reproducing apparatus according to an embodiment of the present invention.

Next, a description will be given of the example in which the storage sequence of the control elements 403 and 404 of the file control information 402 is different from the sequence in FIG. 4 using FIG. 11. In the example in FIG. 11, the content #BLANK 404 is stored at the beginning of the file control information 402. By this means, when adding AV data in step 1906 in FIG. 19, the MPU 1505 can find the beginning sector of the content #BLANK quickly. Accordingly, when writing AV data. addition-processing speed can improved.

Also, a description will be given of the processing for enabling change of the "overwrite allowed (or prohibited)" 403b of a control element 403 in the file control information 402 in FIG. 4 in the recording/reproducing apparatus 1512 of the present embodiment. For example, when changing content of "overwrite prohibited" 403b to "overwrite allowed (delete allowed)", the host 1512 issues a command which includes a part specifying a change command to "overwrite allowed", and a part specifying information identifying desired content (file) to be changed. In the recording/reproducing apparatus 1512 which has received this command, by the MPU 1505 performing command interpretation processing as shown by the flowchart in FIG. 7A, it is determined that the command is a for changing content (file) to "overwrite allowed (delete allowed)" in step 711, and it is further determined which content is specified by the command in step 712. Then the control element 403 of the specified content is rewritten to the "overwrite allowed" 403b. Similarly, when changing content of "overwrite allowed" 403b to "overwrite prohibited (delete prohibited)" after write processing, the host 1513 issues a command which includes a part specifying a change command to "overwrite prohibited", and a part specifying information identifying desired content (file) to be changed. In the command interpretation processing shown in FIG. 7B, the MPU 1505 determines that it is a command for changing content (file) to "overwrite prohibited (delete prohibited)" in step 721, and determines which content is specified by the command in step 722. Then the control element 403 of the specified content is rewritten to the "overwrite prohibited" 403b. Thus the host 1513 becomes possible to control "overwrite allowed/prohibited" 403b of the control information 402 stored in recording/reproducing apparatus 1512, thereby making it possible to achieve a recording/reproducing apparatus which is easy for AV data control.

Furthermore, a description will be given of the processing when the host 1513 desires to divide a piece of content (file) into two piecesat a specific address, and each piece of the content thus divided is handled as an independent piece of content at and after the specific address, or when combining the pieces of content temporarily divided into one piece of content again. When dividing, division processing in which one control element 403 of the file control information 402 in FIG. 4 is divided into two control elements is performed. The host issues a command including a part specifying a command for division of the content (file), and a part specifying the content to be divided and the location (address) thereof. In the recording/reproducing apparatus 1512 which has received this command, by the MPU 1505, performing command interpretation processing as shown by the flowchart in FIG. 8A, it is determined that the command is a command for dividing the content (file) in step 811, and further it is determined which is the content to be divided and the address thereof in step 812. Then the control element 403 which has a physical address corresponding to the specified address as a beginning address 403c is added subsequent to the control element 403 of the specified content. Also, when combining pieces of content temporarily divided, combination processing which combines two divided control elements 403 into one control element is performed. The host issues a command including a part specifying the content (file) combination command, and a part specifying pieces of content to be combined and the addresses thereof. In the recording/reproducing apparatus 1512 which has received this command, by the MPU 1505 performing command interpretation processing as shown by the flowchart in FIG. 8B, it is determined that the command is a command for combining pieces of content (file) in step 821, and is further determined which pieces of content are to be combined and the address thereof in step 822. Then the control elements 403 of the two pieces of specified content are rewritten into the control element 403 of one piece of content which has contiguous data at a specified address. By this processing, the host 1513 can specify addition and deletion of the beginning address 403c of the control element 403 stored in the recording/reproducing apparatus, thereby making it possible to achieve a recording/reproducing apparatus in which AV data division/combination control is easily made.

Next, the recording/reproducing apparatus 1512 of the present embodiment can have a configuration in which concatenation of pieces of content and cancellation thereof can be specified. The concatenation processing and cancellation processing thereof are similar to the division and combination processing in FIG. 8 described above. However, the processing in FIG. 8 is the processing for dividing a piece of content into two divided images and combining pieces of the content by dividing a control element 403 into two elements and combining them once again. The concatenation of content and cancellation thereof described below is the processing in which content itself is not divided, but information 403d (refer to FIG. 12) which specifies which content is the subsequent content is added in the control element 403, and by changing the information, content concatenation specification and cancellation specification is performed. By using this, it is possible to control reading sequence and to repeat reading. When concatenating pieces of content, the host 1513 issues a command which includes a part for specifying a concatenation command and a part for specifying concatenation target content. In the recording/reproducing apparatus 1512 which has received this command, by the MPU 1505 performing command interpretation processing as shown by the flowchart in FIG. 9A, it is determined that the command is a for concatenation of content (file) in step 911, and pieces of content to be concatenated is determined in step 912. Then information 403d (FIG. 12) which specifies content to be concatenated to the control element 403 of the specified content is changed. On the other hand, when canceling concatenation, the host 1513 issues a command which includes a part for specifying a concatenation cancellation command and a part for specifying pieces of content to cancel concatenation. In the recording/reproducing apparatus 1512 which has received this command, by the MPU 1505 performing command interpretation processing as shown by the flowchart in FIG. 9B, it is determined that the command is for concatenation cancellation of content (file) in step 921, and pieces of content to be concatenation-canceled is further determined in step 922. Then concatenation information 403d described in the control element 403 of the specified content is canceled.

Figure 12:
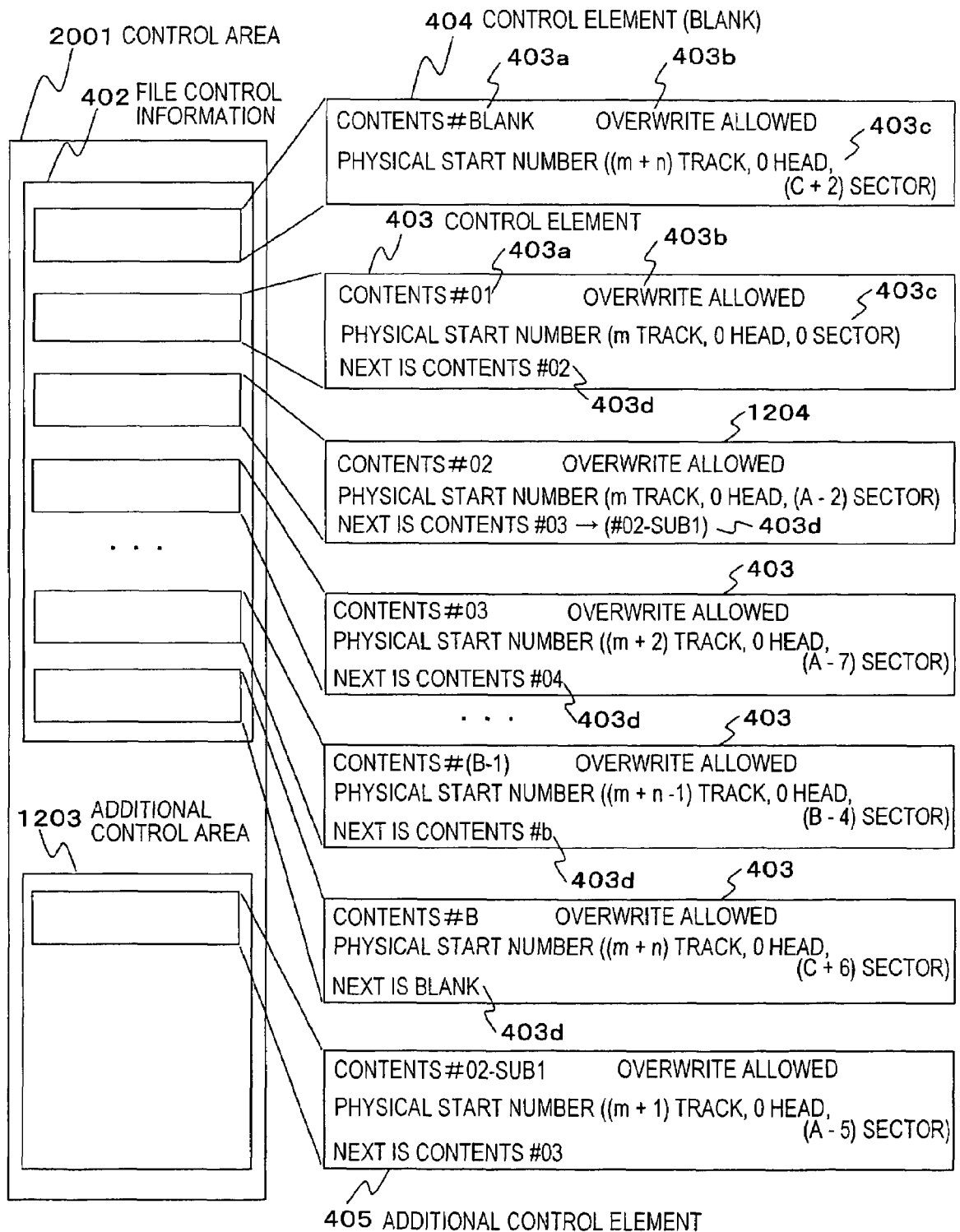
FIG. 12 is a schematic diagram illustrating the structure in which concatenation information 403d is added to the control area 2001 of the recording/reproducing apparatus according to an embodiment of the present invention.
Figure 13A:
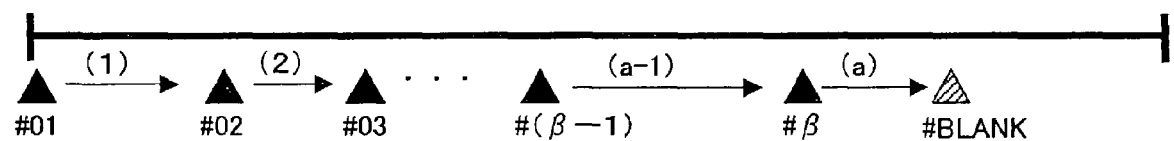
FIG. 13A is a schematic diagram illustrating the magnetic head movement when concatenation is specified in content number sequence in the recording/reproducing apparatus according to an embodiment of the present invention.

By using the concatenation processing, even when an additional control element 405 is stored in the additional control area as shown in FIG. 12, it is easily understood to which content of the control element 403 the additional control element 405 is concatenated. For example, when the additional control element 405 has not been added, if concatenation is specified from content #01 in the sequence of content number, the magnetic head continuously reads data in sequence from the beginning sector of the content #01 as shown in FIG. 13A. Here suppose that content

Figure 13B:
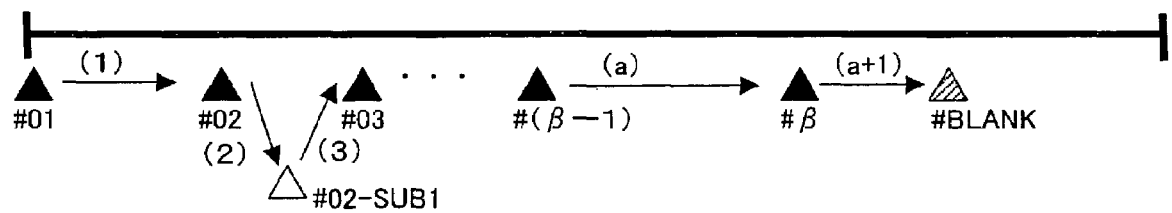
FIG. 13B is a schematic diagram illustrating the magnetic head movement when concatenation, in which content #2-sub is inserted between content #02 and content #03, is specified in the recording/reproducing apparatus according to an embodiment of the present invention.

02-sub of the additional control element 405 is to be added between the content #02 and the content #03. In this case, by the above-described processing, concatenation information 403d is added to control elements 1204 and 1205 as shown in FIG. 12. Thus when reading data, the magnetic head moves to (A–5) sector of m+1 track next to the content #02, returns to (A–7) sector of m+2 track after reading the content #2 -sub, and can read the content #03 and subsequent content in sequence, as shown in FIG. 13B.

In this regard, in FIG. 12, a content number is used as concatenation information 403d for convenience, if the control element 403 is identified, it is possible to configure it in a manner that the beginning address 403c is used for specification.

Also, in the above-described embodiment, as shown in FIGS. 4 and 12, only the beginning address 403c of content is specified in the control element 403, and the end address is obtained from the information of the beginning address 403c of the next control element 403. However, if the control is difficult, it is of course possible to use the configuration in which information on the number of sectors of content (information specified in step 67 in FIG. 6A) is entered in the control element 403.

Further, in the above-described embodiment, the host 1513 specifies the response time of AV data in a read command and a write command, however, the host may issue a command which specifies the response time. For example, the host 1513 issues a command including a part specifying a response-time specification command, and a part specifying the value of the response time. In the recording/reproducing apparatus 1512 which has received this command, by the MPU 1505 performing command interpretation processing as shown by the flowchart in FIG. 10, it is determined that the command is for specifying the response time in step 1001, and the value of the response time is determined in step 1002. By this processing, it becomes possible to specify the AV data response limit time of the recording/reproducing apparatus in advance before issuing a rewrite command and a read command.

In the description of the present embodiment described above, a description has been given that, in FIG. 21, PC data defective sector table is 2101 for skip processing and AV data defective sector table is 2102 for slip processing. However, even for PC data, there may be slip information before factory shipment in the same way as the conventional case. Moreover, if processing time is allowed, skip-processing information, of course, may be used for AV data too.

What is claimed is:

1. A recording/reproducing apparatus comprising:
   a recording medium;
   reception means which receives data from a host;
   recording means which writes the data into the recording medium;
   control means;
   defective sector storage means which stores defective sectors;
   control-information storage means which stores attribute of AV data recorded in the recording medium; and
   the attribute including information indicating whether or not the AV data is allowed to be overwritten,
   wherein when the data received by the reception means as data to be written into the recording medium is AV data, which is audio and/or video data, and a sector of the recording medium in which the data is to be written is registered in the defective sector storage means, the data to be written into the defective sector is written into a sector which is physically contiguous with the defective sector and is not defective, and
   wherein another AV data is already written in the sector which is physically contiguous with the defective sector and is not defective, the control means checks whether or not the attribute of said another AV data stored in the control-information storage means is information indicating overwrite allowed, and if the information indicates overwrite allowed, said another AV data is overwritten with the data to be written.

2. A recording/reproducing apparatus according to claim 1,
   wherein even when another AV data has already been written in the sector which is physically contiguous with the defective sector and is not defective, the data is written into the sector overwriting said another AV data.

3. A recording/reproducing apparatus according to claim 1,
   wherein a beginning address of the recorded AV data is registered in the control information storage means,
   the control means sets the beginning address of the other AV data which has been overwritten in units of a predetermined number of sectors from the beginning address before overwriting to register the address again in the control information storage means.

4. A recording/reproducing apparatus according to claim 1,
   wherein when the data received by the reception means as data to be written into the recording medium is not AV data, if a sector of the recording medium in which the data is written is registered in the defective sector storage means, data to be written into the defective sector is written into a specific sector predetermined as an alternative sector.

5. A recording/reproducing apparatus according to claim 4,
   wherein the defective sector storage means comprises a first defective sector storage part which stores defective sectors for writing the AV data and a second defective sector storage part which stores defective sectors for writing data other than the AV data,
   when the data to be written is AV data, the control means determines the sector stored in the first defective sector storage part as the defective sector, and when the data to be written is not AV data, the control means determines the sector stored in the second defective sector storage part as a defective sector.

6. A recording/reproducing apparatus according to claim 1,
   wherein the reception means receives, from the host, AV data to be written into the recording medium and the attribute indicating whether or not overwriting on the AV data is allowed, and the control means registers address information identifying a beginning sector of the recording medium in which the AV data has been written and the attribute correspondingly in the control-information storage means.

7. A recording/reproducing apparatus according to claim 5, further comprising:
   reproducing means which reads data from the recording medium,
   wherein the reproducing means includes correction means which corrects an error of the read data for each sector,
   for the data read by the reproducing means, the control means registers the sector having a number of corrections by the correction means being larger than a predetermined limit value E2 in the second defective sector storage part, and the control means registers the sector having a number of corrections by the correction means being larger than a predetermined limit value E1, but not greater than E2, in the first defective sector storage part.

8. A recording/reproducing apparatus according to claim 6, wherein when the reception means receives the attribute which prohibits overwriting the AV data, the control means moves the AV data with the prohibited attribute to a predetermined area in the recording medium, and registers address information identifying a beginning sector of a moving destination in the control-information storage means.

9. A recording/reproducing apparatus comprising:

a recording medium;

reception means which receives AV data from a host;

recording means which writes said AV data into said recording medium;

reproducing means which reads said AV data from said recording medium;

control-information storage means; and control means;

wherein when said reception means receives a first write command and first AV data in connection with said first write command, said recording means writes said first AV data to said recording medium, and said control means registers address information for identifying a beginning sector of said written first AV data in said control-information storage means, when said reception means receives a second write command and second AV data in connection with said second write command, if said control means judges that said second AV data is contiguous with said first AV data, said recording means writes said second AV data from the sector next to the last sector of said first AV data in said recording medium and said control means does not register address information for identifying a beginning sector of said written second AV data in said control-information storage means, and when said reception means receives a first read command in connection with said first AV data, said reproducing means reads said first and second AV data contiguously.

10. A recording/reproducing apparatus according to claim 9, wherein said control means judges contiguity of said AV data based on contiguity indicating information of said second write command.

11. A recording/reproducing apparatus according to claim 9, wherein said control means judges contiguity of said AV data based on an identification number of said first and second AV data received by said reception means from said host.

12. A recording/reproducing apparatus according to claim 9, wherein said control-information storage means is a predetermined area on said recording medium.

13. A recording/reproducing apparatus according to claim 9, wherein said control means transfers information registered in said control-information storage means to said host based on a request from said host.

14. A recording/reproducing apparatus according to claim 9, wherein said reception means receives information specifying a reading sequence of said AV data recorded in said recording medium from said host, said control means registers the information specifying the reading sequence in said control-information storage means.

15. A recording/reproducing apparatus according to claim 14, wherein:

said control means controls said reproducing means such that said AV data is read in accordance with the reading sequence registered in said control-information storage means.

* * * * *